(12) United States Patent
Kurozuka et al.

(10) Patent No.: US 12,123,829 B2
(45) Date of Patent: Oct. 22, 2024

(54) OPTICAL DEVICE

(71) Applicant: Panasonic Intellectual Property Management Co., Ltd., Osaka (JP)

(72) Inventors: Akira Kurozuka, Osaka (JP); Tatsuo Itoh, Osaka (JP); Kosuke Imawaka, Kyoto (JP); Hiroyuki Furuya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/726,697

(22) Filed: Apr. 22, 2022

(65) Prior Publication Data

US 2022/0244177 A1    Aug. 4, 2022

Related U.S. Application Data

(63) Continuation of application No. PCT/JP2020/027731, filed on Jul. 16, 2020.

(30) Foreign Application Priority Data

Oct. 23, 2019  (JP) ................................. 2019-192728

(51) Int. Cl.
*G01N 21/3554*  (2014.01)
*G01J 1/04*  (2006.01)
(Continued)

(52) U.S. Cl.
CPC ........ *G01N 21/3554* (2013.01); *G01J 1/0411* (2013.01); *G01J 1/0455* (2013.01);
(Continued)

(58) Field of Classification Search
CPC .. G01N 21/3554; G01N 21/359; G01N 21/47; G01N 2021/4761; G08G 1/00; G01J 1/0455; G01J 1/0411
See application file for complete search history.

(56) References Cited

U.S. PATENT DOCUMENTS

| | | | |
|---|---|---|---|
| 4,859,054 A * | 8/1989 | Harrison | ............... F42C 13/023 |
| | | | 102/213 |
| 2015/0124336 A1 * | 5/2015 | Kaufman | .................. G01J 3/36 |
| | | | 359/728 |

FOREIGN PATENT DOCUMENTS

| | | |
|---|---|---|
| JP | 11-295216 A | 10/1999 |
| JP | 11-337484 A | 12/1999 |

(Continued)

OTHER PUBLICATIONS

International Search Report issued in corresponding International Patent Application No. PCT/JP2020/027731, dated Sep. 15, 2020, with English translation.

*Primary Examiner* — Christine S. Kim
(74) *Attorney, Agent, or Firm* — Rimon P.C.

(57) ABSTRACT

An optical device includes: a light source part configured to project illumination light toward a sensing region; a photodetector configured to receive reflected light of the illumination light reflected on the sensing region; and a condenser mirror. The condenser mirror has a through hole through which the illumination light from the light source part passes and an optical axis of the light source part and an optical axis of the condenser mirror are aligned with each other. A reflection surface of the condenser mirror has a shape obtained by cutting out a columnar body extending in a projection direction of the illumination light, with a spheroid whose rotation axis is a major axis. The photodetector is disposed in a direction toward a first focal position of the (Continued)

condenser mirror. The sensing region is set in a direction toward a second focal position of the condenser mirror.

17 Claims, 18 Drawing Sheets

(51) Int. Cl.
 *G01N 21/359* (2014.01)
 *G01N 21/47* (2006.01)
 *G08G 1/00* (2006.01)
(52) U.S. Cl.
 CPC ............ *G01N 21/359* (2013.01); *G01N 21/47* (2013.01); *G08G 1/00* (2013.01); *G01N 2021/4761* (2013.01)

(56) References Cited

FOREIGN PATENT DOCUMENTS

| | | | |
|---|---|---|---|
| JP | 2001-051060 A | 2/2001 | |
| JP | 2001-216592 A | 8/2001 | |
| SE | 531949 C2 * | 9/2009 | ............. B64D 15/20 |

* cited by examiner

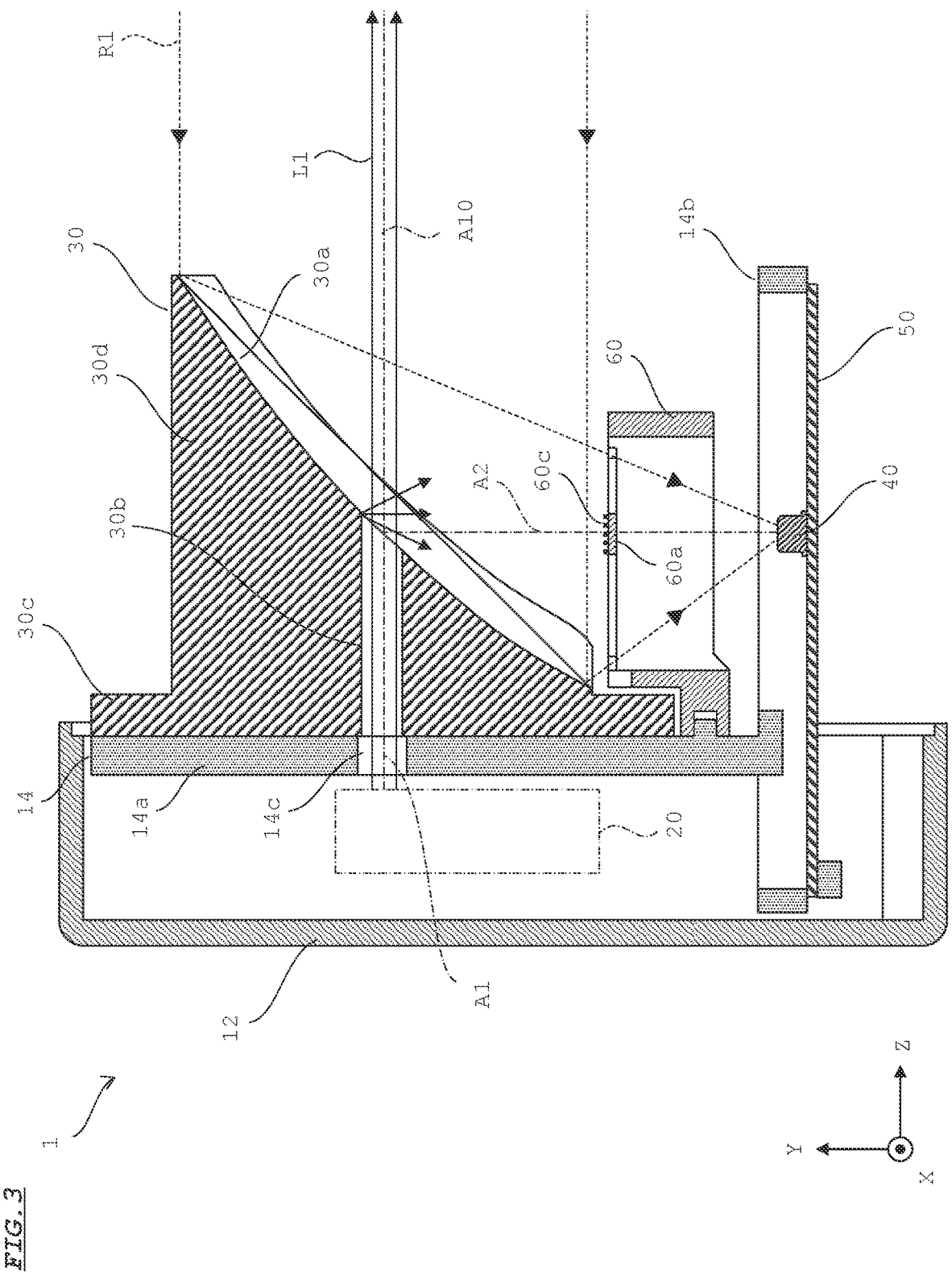

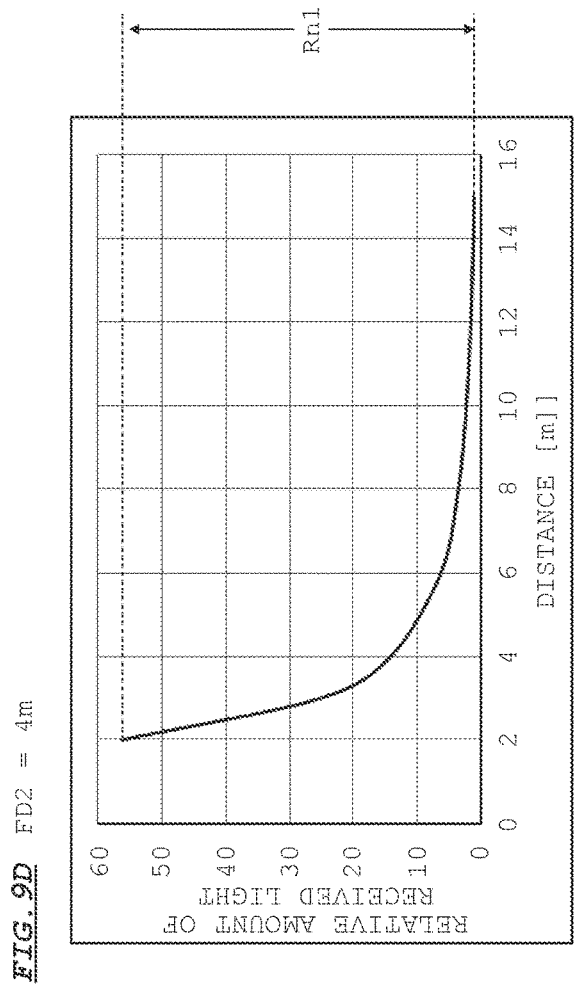
FIG. 9D FD2 = 4m
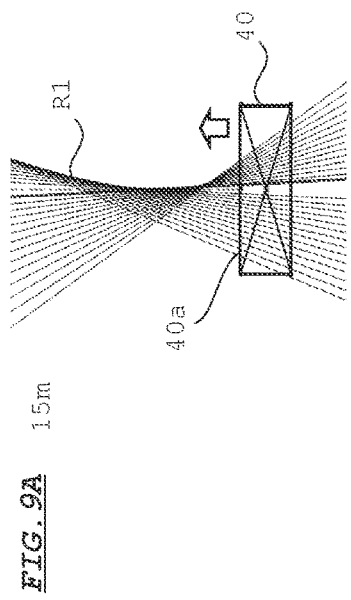
FIG. 9A 15m
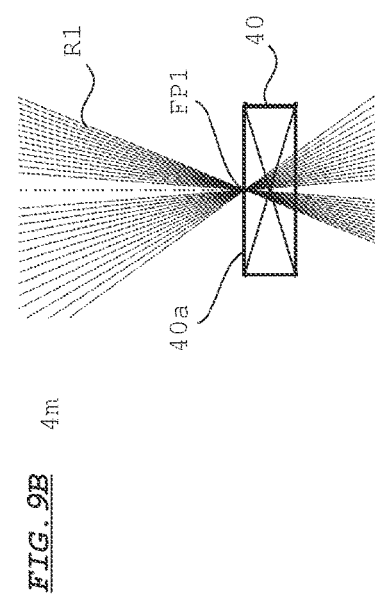
FIG. 9B 4m
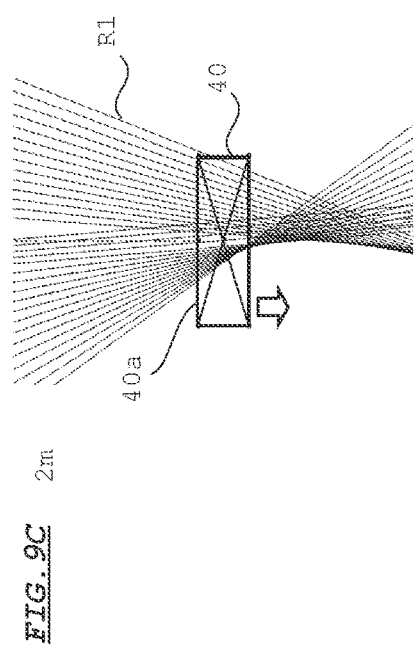
FIG. 9C 2m

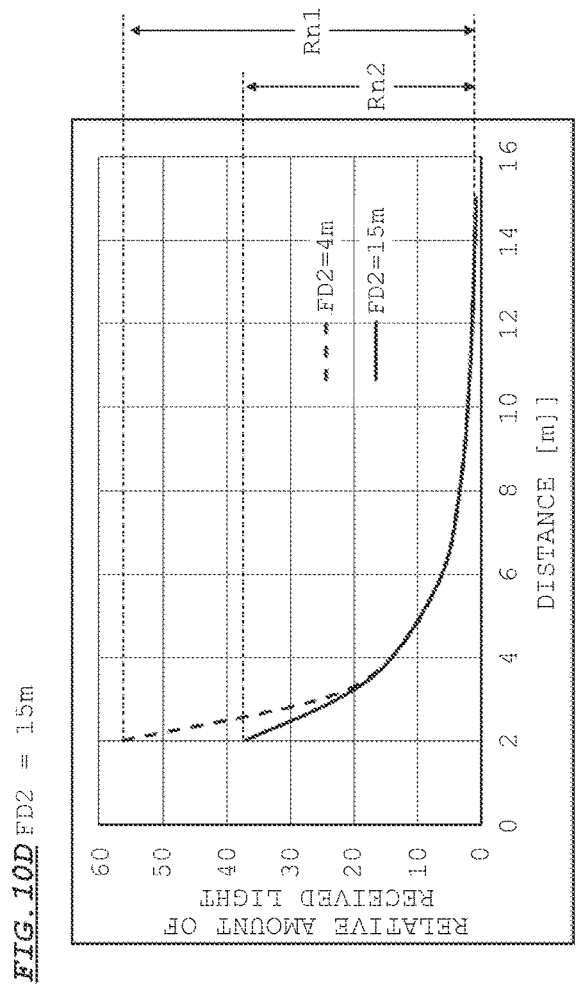
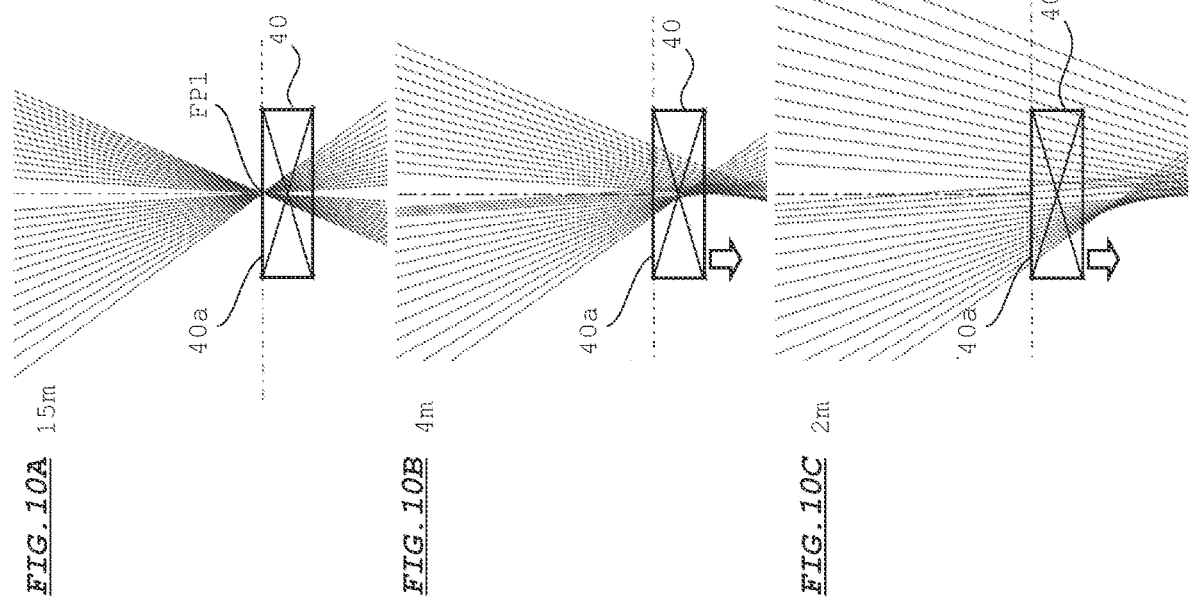

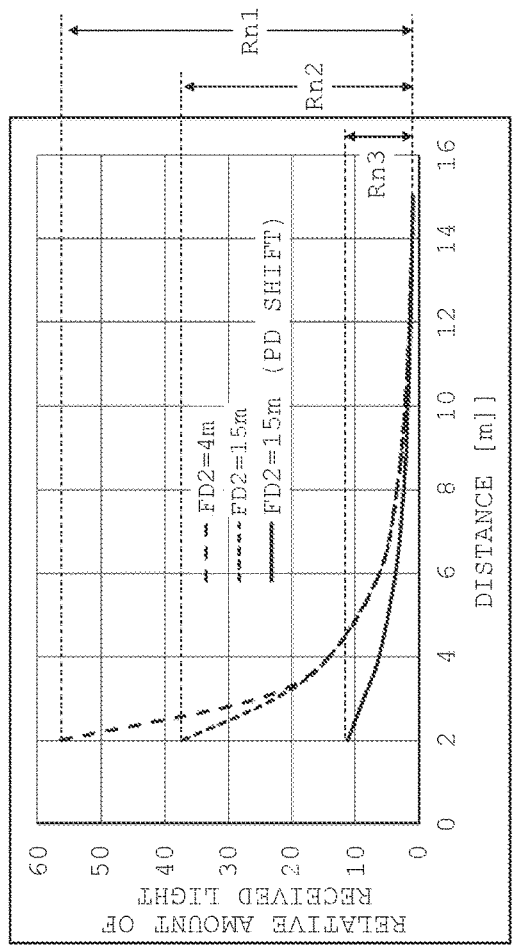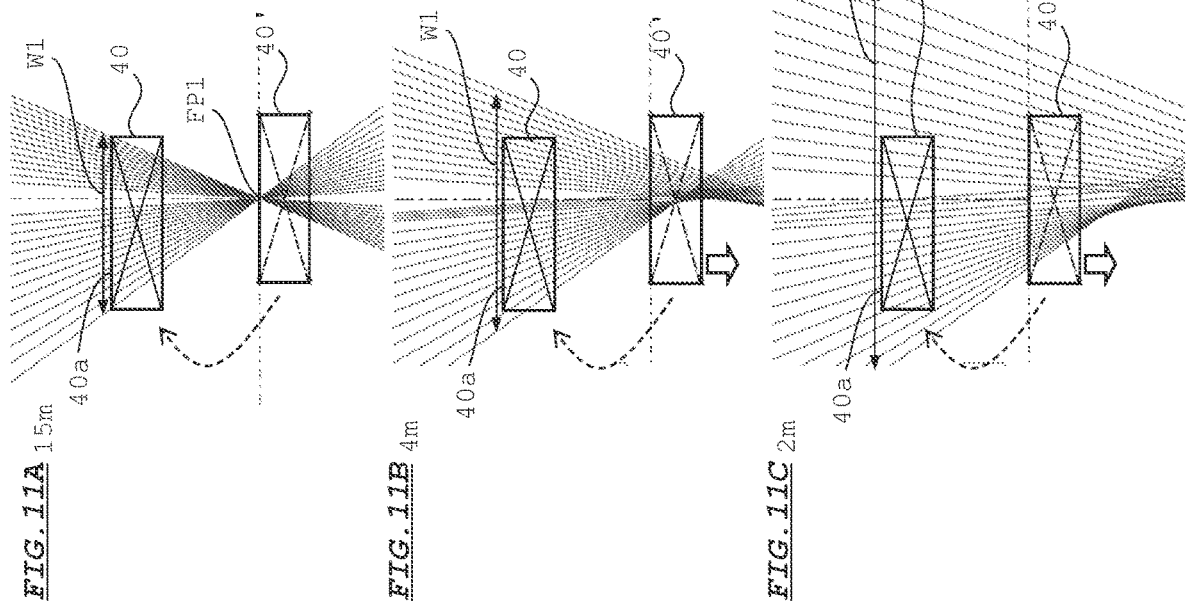

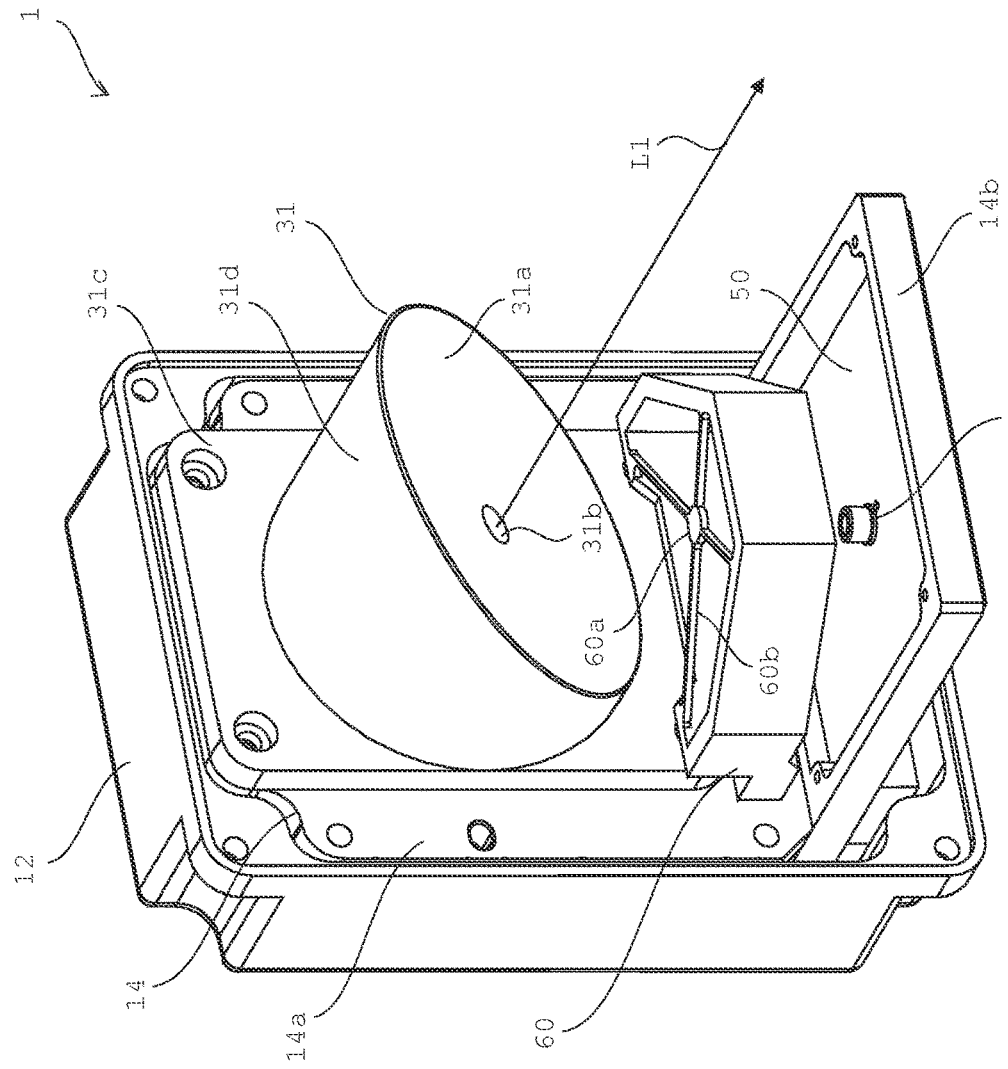
FIG. 13 MODIFICATION

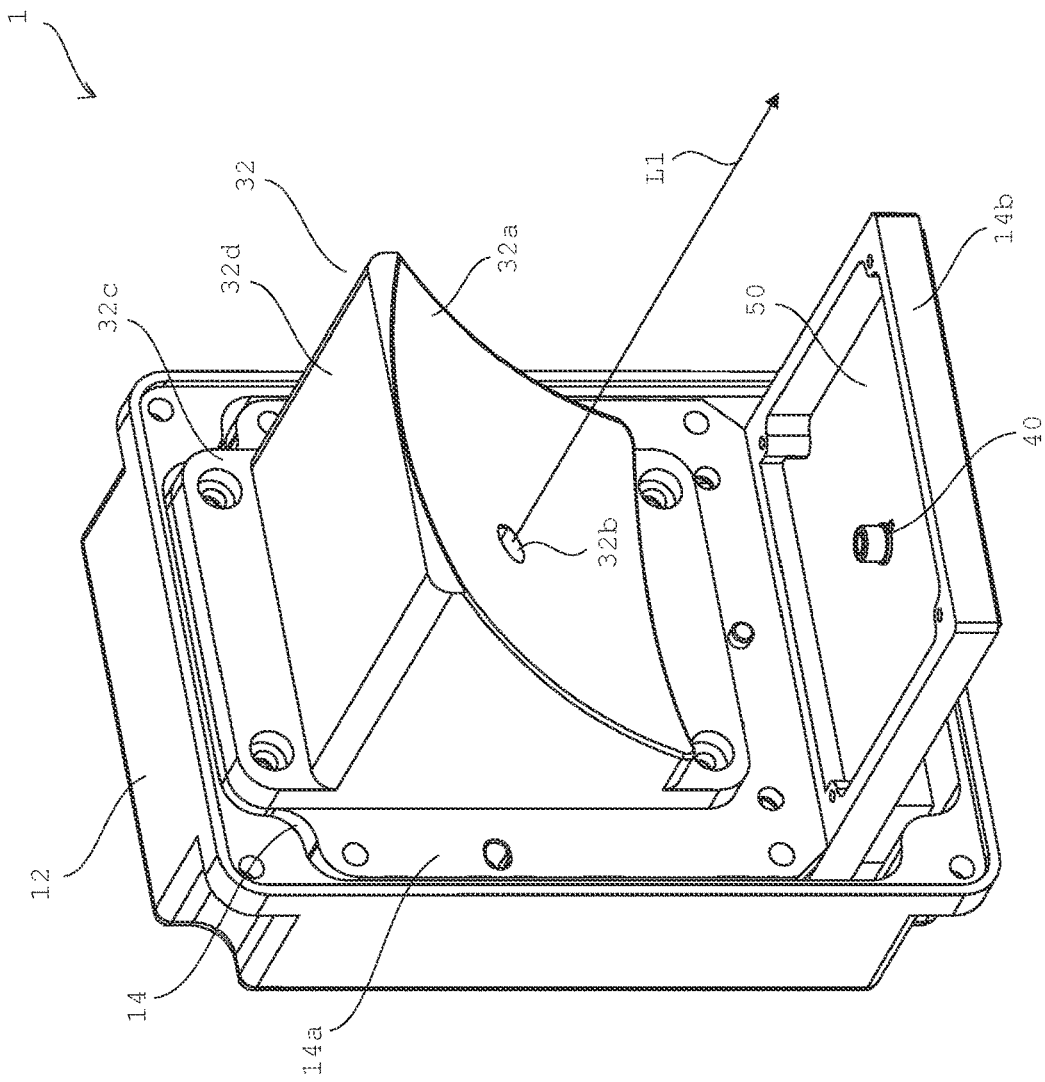

OPTICAL DEVICE

CROSS REFERENCE TO RELATED APPLICATION

This application is a continuation of International Application No. PCT/JP2020/027731 filed on Jul. 16, 2020, entitled "OPTICAL DEVICE", which claims priority under 35 U.S.C. Section 119 of Japanese Patent Application No. 2019-192728 filed on Oct. 23, 2019, entitled "MOISTURE SENSING DEVICE". The disclosures of the above applications are incorporated herein by reference.

BACKGROUND OF THE INVENTION

1. Field of the Invention

The present invention relates to an optical device that includes an emission optical system and a light-receiving optical system and that is suitable for use, for example, for the case of sensing the state of moisture on a sensing region.

2. Disclosure of Related Art

To date, a road surface sensing device that senses the state of a road surface has been known. For example, Japanese Laid-Open Patent Publication No. 2001-216592 describes a road surface state sensing device that applies illumination light to a sensing region of a road surface and that determines, on the basis of reflected light thereof, whether or not a sensing target object such as ice or water is present. In this device, as the illumination light, detection light and reference light having wavelengths different from each other are sequentially switched and applied to the sensing region. In addition, in synchronization with the switching of the lights, reflected light of each light is received and an electric signal is generated. These electric signals are subjected to comparison operation, and whether or not a sensing target object such as water or ice is present in the sensing region is determined on the basis of the operation result.

In the configuration according to the above Japanese Laid-Open Patent Publication. No. 2001-216592, illumination light and reflected light are individually applied and received by separate optical systems, respectively, in directions different from each other. Therefore, the application angle of illumination light and the reception angle of reflected light need to be adjusted in accordance with the distance between the road surface state sensing device and the sensing region. Such adjusting work is very complicated.

SUMMARY OF THE INVENTION

An optical device according to a first aspect of the present invention includes: a light source part configured to project illumination light toward a sensing region; a photodetector configured to receive reflected light of the illumination light reflected on the sensing region; and a condenser mirror configured to condense the reflected light on the photodetector. Here, the condenser mirror has a through hole through which the illumination light emitted from the light source part passes and an optical axis of the light source part and an optical axis of the condenser mirror are aligned with each other. In addition, a reflection surface of the condenser mirror has a shape obtained by cutting out a columnar body extending in a projection direction of the illumination light, with a spheroid whose rotation axis is a major axis. Moreover, the photodetector is disposed in a direction toward a first focal position of the condenser mirror with respect to the condenser mirror, and the sensing region is set in a direction toward a second focal position of the condenser mirror with respect to the condenser mirror.

In the optical device according to this aspect, since the optical axis of the light source part and the optical axis of the condenser mirror are aligned with each other, reflected light, out of the reflected light reflected on the sensing region, that travels backward along the aligned optical axis is condensed on the photodetector by the condenser mirror. Therefore, the angles of the illumination light and the reflected light with respect to the sensing region do not need to be adjusted in accordance with the distance between the device and the sensing region, and even without such adjustment, the reflected light from the sensing region can be appropriately received by the photodetector.

Moreover, the reflection surface of the condenser mirror has a shape obtained by cutting out a columnar body extending in the projection direction of the illumination light, with a spheroid whose rotation axis is a major axis. Therefore, by disposing the photodetector in the direction toward the first focal position of the condenser mirror with respect to the condenser mirror and setting the sensing region in the direction toward the second focal position of the condenser mirror with respect to the condenser mirror, the reflected light from the sensing region is efficiently guided to the photodetector.

An optical device according to a second aspect of the present invention includes: a light source part configured to project illumination light toward a sensing region; a photodetector configured to receive reflected light of the illumination light reflected on the sensing region; and a condenser mirror configured to condense the reflected light on the photodetector. Here, a reflection surface of the condenser mirror has a shape obtained by cutting out a columnar body extending in a projection direction of the illumination light, with a spheroid whose rotation axis is a major axis parallel to the projection direction. In addition, the photodetector is disposed in a direction toward a first focal position of the condenser mirror with respect to the condenser mirror, and the sensing region is set in a direction toward a second focal position of the condenser mirror with respect to the condenser mirror.

In the optical device according to this aspect, the reflection surface of the condenser mirror has a shape obtained by cutting out a columnar body extending in the projection direction of the illumination light, with a spheroid whose rotation axis is a major axis parallel to the projection direction. Therefore, by disposing the photodetector in the direction toward the first focal position of the condenser mirror with respect to the condenser mirror and setting the sensing region in the direction toward the second focal position of the condenser mirror with respect to the condenser mirror, the reflected light from the sensing region can be efficiently guided to the photodetector. Therefore, the reflected light from the sensing region can be appropriately received by the photodetector.

The optical device according to the second aspect may include an optical element configured to align an optical axis of the light source part and an optical axis of the condenser mirror with each other.

In this configuration, since the optical axis of the light source part and the optical axis of the condenser mirror are aligned with each other, reflected light, out of the reflected light reflected on the sensing region, that travels backward along the aligned optical axis is condensed on the photodetector by the condenser mirror. Therefore, the angles of the illumination light and the reflected light with respect to the sensing region do not need to be adjusted in accordance with the distance between the device and the sensing region, and even without such adjustment, the reflected light from the sensing region can be appropriately received by the photodetector.

BRIEF DESCRIPTION OF THE DRAWINGS

FIG. 3 is a cross-sectional view of the moisture sensing device according to Embodiment 1;

FIG. 9A to FIG. 9C are each a ray diagram obtained by simulation of a state of rays of reflected light incident on the light-receiving surface of a photodetector when a reflection surface and the light-receiving surface of the photodetector are formed according to conditions of Adjustment Method 1, according to Embodiment 1;

FIG. 9D is a graph showing a relationship between a distance to a sensing region and a relative amount of light received by the photodetector when the reflection surface and the light-receiving surface are set according to the conditions of Adjustment Method 1, according to Embodiment 1;

FIG. 10A to FIG. 10C are each a ray diagram obtained by simulation of a state of rays of reflected light incident on the light-receiving surface of the photodetector when a reflection surface and the light-receiving surface of the photodetector are formed according to conditions of Adjustment Method 2, according to Embodiment 1;

FIG. 10D is a graph showing a relationship between a distance to a sensing region and a relative amount of light received by the photodetector when the reflection surface and the light-receiving surface are set according to the conditions of Adjustment Method 2, according to Embodiment 1;

FIG. 11A to FIG. 11C are each a ray diagram obtained by simulation of a state of rays of reflected light incident on the light-receiving surface of the photodetector when a reflection surface and the light-receiving surface of the photodetector are formed according to conditions of Adjustment Method 3, according to Embodiment 1;

FIG. 11D is a graph showing a relationship between a distance to a sensing region and a relative amount of light received by the photodetector when the reflection surface and the light-receiving surface are set according to the conditions of Adjustment Method 3, according to Embodiment 1;

FIG. 13 is a perspective view showing an external configuration of a moisture sensing device in a state where a front housing is removed therefrom, according to a modification of Embodiment 1;

FIG. 15 is a perspective view showing an external configuration of a moisture sensing device in a state where a front housing is removed therefrom, according to Embodiment 2;

It should be noted that the drawings are solely for description and do not limit the scope of the present invention by any degree.

DESCRIPTION OF PREFERRED EMBODIMENTS

Hereinafter, an embodiment of the present invention will be described with reference to the drawings.

In the present embodiment, a moisture sensing device that senses moisture (water, snow, ice, or the like) deposited on a road surface that is a sensing region is described as an example of an optical device according to the present invention. For convenience, in each drawing, X, Y, and Z axes that are orthogonal to each other are additionally shown as appropriate. The X-axis direction, the Y-axis direction, and the Z-axis direction are the width direction, the height direction, and the front-back direction of a moisture sensing device 1, respectively. The Z-axis positive direction is the projection direction of illumination light.

<Structure of Device>

Figure 1:
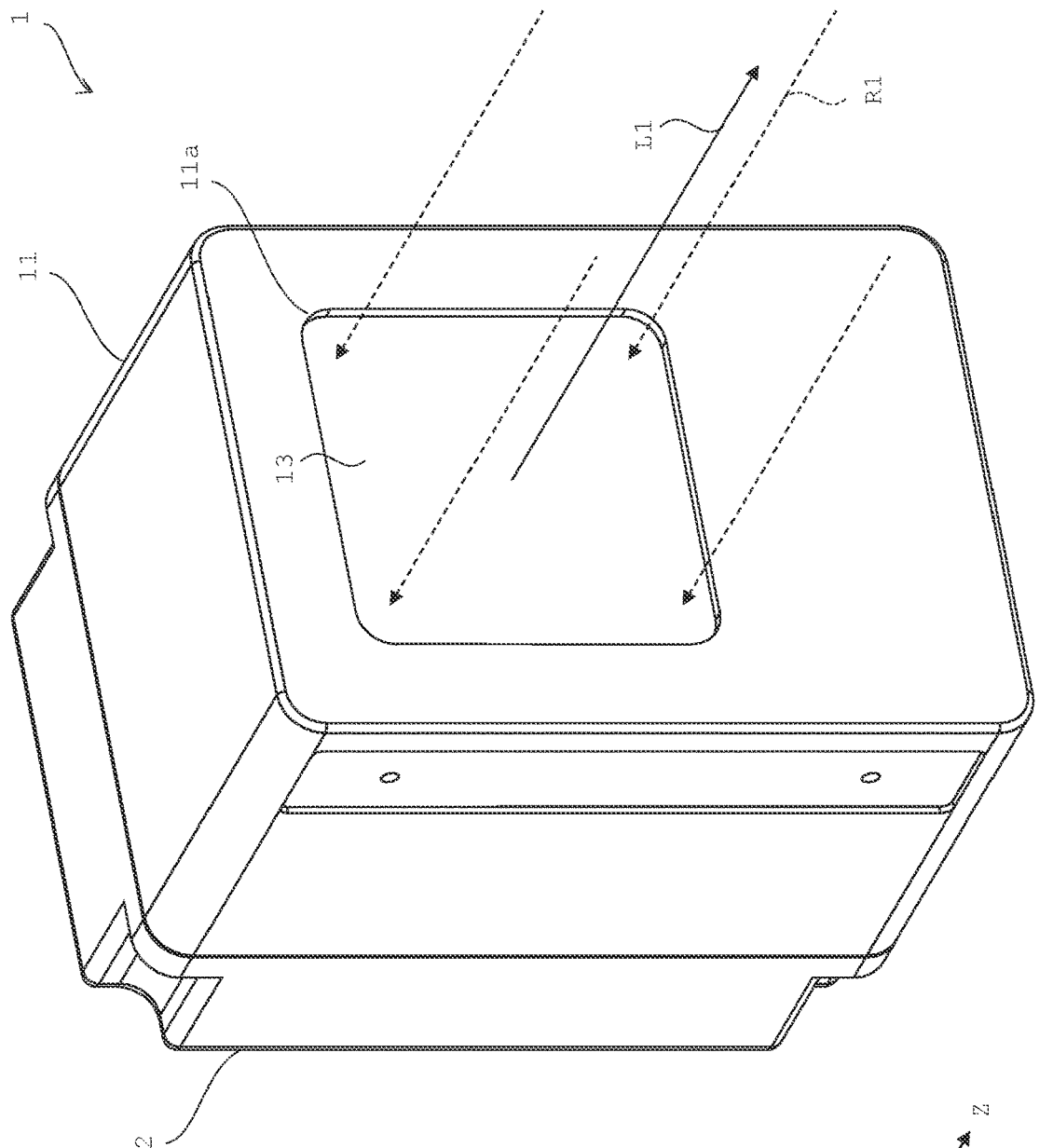
FIG. 1 is a perspective view showing an external configuration of a moisture sensing device according to Embodiment 1.

FIG. 1 is a perspective view showing an external configuration of the moisture sensing device 1.

As shown in FIG. 1, the moisture sensing device 1 has a box shape similar to a rectangular parallelepiped. The outer shell of the moisture sensing device 1 is formed by combining housings 11 and 12 in the front-back direction. An opening 11a having a substantially square shape is formed in the front surface of the housing 11. The opening 11a is closed by a window member 13. The window member 13 is a band pass filter that blocks visible light and that transmits infrared light. Illumination light L1 is projected from the inside of the housings 11 and 12 via the window member 13 to a road surface (sensing region). In addition, reflected light R1 of the illumination light L1 is taken into the inside of the housings 11 and 12 via the window member 13.

Figure 2:
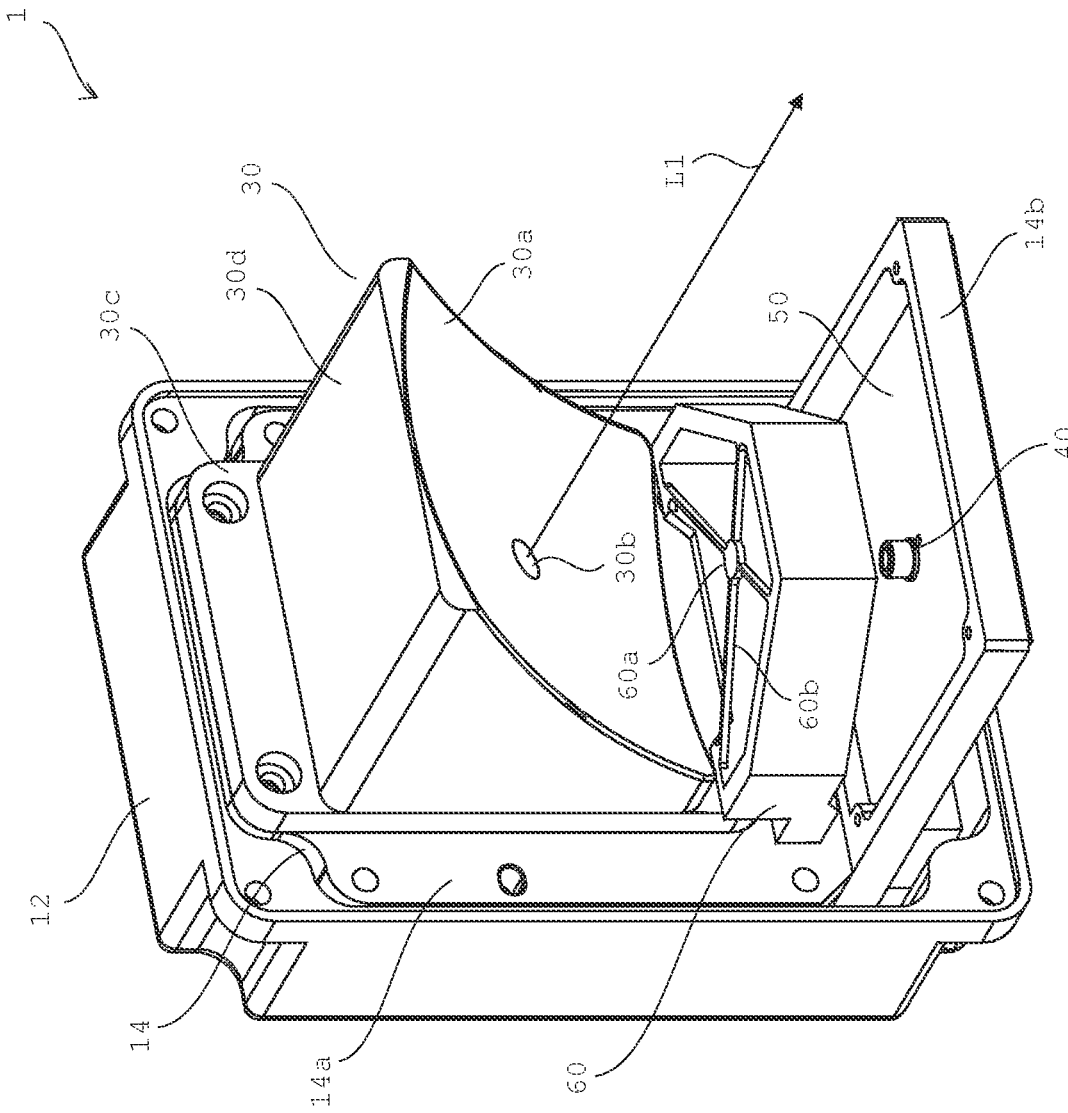
FIG. 2 is a perspective view showing an external configuration of the moisture sensing device in a state where a front housing is removed therefrom, according to Embodiment 1.

FIG. 2 is a perspective view showing an external configuration of the moisture sensing device 1 in a state where the front housing 11 is removed therefrom. FIG. 3 is a cross-sectional view of the moisture sensing device 1 in FIG. 2, taken at the center position in the X-axis direction along a plane parallel to the Y-Z plane.

Referring to FIG. 2 and FIG. 3, the moisture sensing device 1 includes a light source part 20, a condenser mirror 30, a photodetector 40, a circuit board 50, and a light blocking member 60. The light source part 20 projects infrared lights having three kinds of wavelengths, in the Z-axis positive direction. The illumination light L1 is composed of these infrared lights. The illumination light L1 is projected to a road surface (sensing region).

Figure 4B:
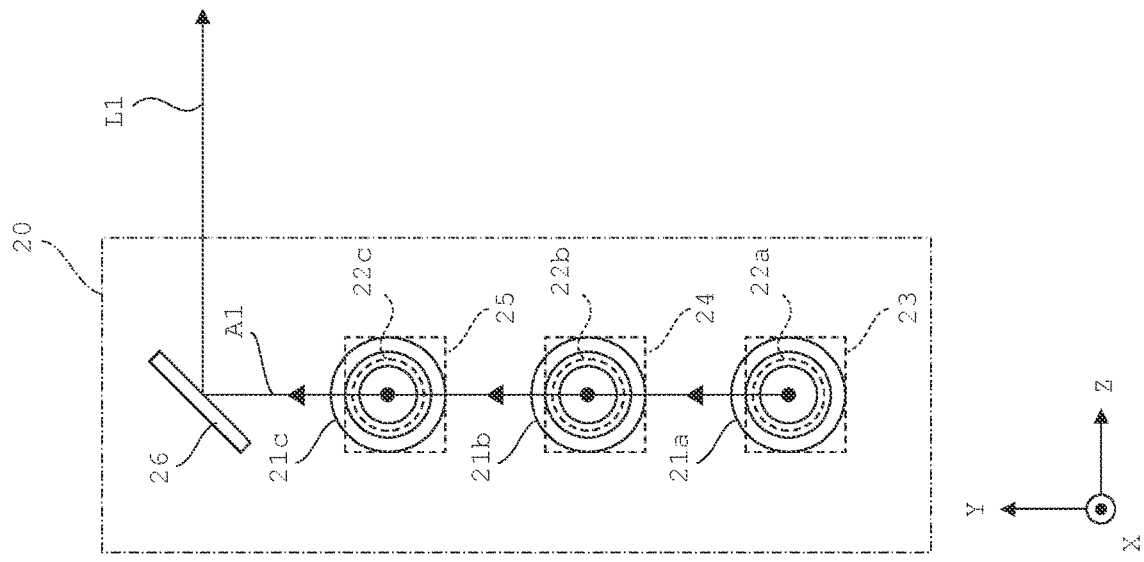
FIG. 4A and FIG. 4B each show a configuration of a light source part according to Embodiment 1.
Figure 4A:
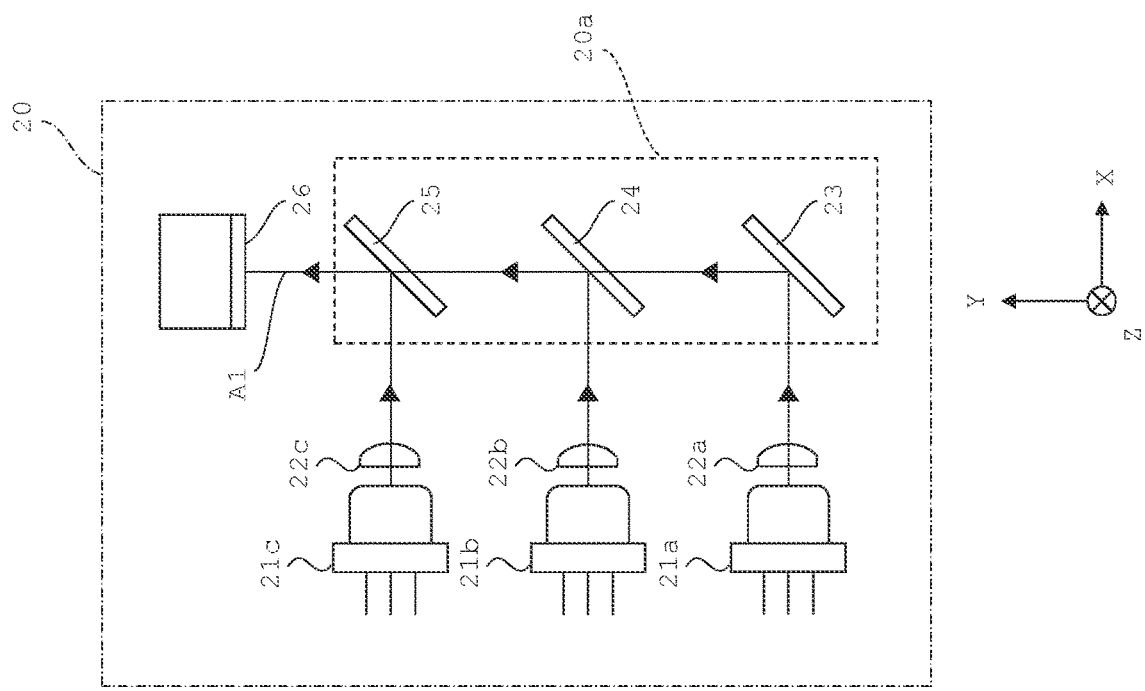

FIG. 4A and FIG. 4B each show a configuration of the light source part 20.

The light source part 20 includes three light sources 21a, 21b, and 21c having wavelengths different from each other. The light sources 21a, 21b, and 21c are each a laser light source such as a semiconductor laser, for example. The light sources 21a, 21b, and 21c may each be implemented as an LED, or a white light source provided with a filter that allows a specific wavelength to pass therethrough. The light source 21a emits near infrared light having a wavelength of 980 nm (hereinafter, referred to as a "reference wavelength"). The light source 21b emits near infrared light having a wavelength of 1450 nm (hereinafter, referred to as an "absorption wavelength 1"). The light source 21c emits near infrared light having a wavelength of 1550 nm (hereinafter, referred to as an "absorption wavelength 2"). The light sources 21a, 21b, and 21c each emit the illumination light L1 in the same direction (X-axis positive direction). The emission optical axes of the light sources 21a, 21b, and 21c are included in the same plane parallel to the X-Y plane.

The light source part 20 further includes collimator lenses 22a, 22b, and 22c, a mirror 23, and dichroic mirrors 24 and 25. The collimator lenses 22a, 22b, and 22c convert the illumination lights L1 emitted from the light sources 21a, 21b, and 21c, into collimated lights, respectively. The mirror 23 reflects the illumination light L1 emitted from the light source 21a, in the Y-axis positive direction. The dichroic mirror 24 allows the illumination light L1 emitted from the light source 21a to pass therethrough, and reflects the illumination light L1 emitted from the light source 21b, in the Y-axis positive direction. Accordingly, the emission optical axis of the light source 21a and the emission optical axis of the light source 21b are aligned with each other.

The dichroic mirror 25 allows the two illumination lights L1 incident thereon from the dichroic mirror 24 side to pass therethrough, and reflects the illumination light L1 emitted from the light source 21c, in the Y-axis positive direction. Accordingly, the emission optical axes of the light sources 21a, 21b, and 21c are aligned with one optical axis A1. The mirror 23 and the dichroic mirrors 24 and 25 form an alignment optical system 20a which aligns the emission optical axes of the light sources 21a, 21b, and 21c with each other. The optical axis A1 is bent in the Z-axis positive direction by a mirror 26. Accordingly, the illumination lights L1 emitted from the light sources 21a, 21b, and 21c, respectively, are emitted in the Z-axis positive direction from the light source part 20.

Referring back to FIG. 2 and FIG. 3, the condenser mirror 30 is formed from a metal material such as aluminum. The condenser mirror 30 may be formed from a resin material. The condenser mirror 30 has a reflection surface 30a at a face on the side opposite to the light source part 20. The reflection surface 30a is a curved surface recessed inward of the condenser mirror 30. The reflection surface 30a is formed by performing mirror finish on an inwardly recessed curved surface and then depositing a high-reflectance material such as gold on the curved surface. The shape of the reflection surface 30a is a shape obtained by cutting out a columnar body having a quadrangular prism shape extending in the projection direction of the illumination light L1, with a spheroid whose rotation axis is a major axis parallel to the projection direction. A method for setting the shape of the reflection surface 30a will be described later with reference to FIG. 8.

A through hole 30b for allowing the illumination lights L1 emitted from the light source part 20 to pass therethrough is further formed in the condenser mirror 30. The through hole 30b is formed along the central axis of a columnar portion 30d. The illumination light L1 passes through an opening 14c and the through hole 30b and is projected to the road surface (sensing region) ahead. The condenser mirror 30 aligns the optical axis A1 of the light source part 20 and an optical axis A2 of the condenser mirror 30 itself with each other in a range on the road surface side (range in the projection direction of the illumination light L1 from the condenser mirror 30). That is, these two optical axes A1 and A2 are integrated into a common optical axis A10 by the condenser mirror 30. The optical axis A2 of the condenser mirror 30 is perpendicular to the optical axis A1 of the light source part 20.

The condenser mirror 30 reflects the reflected light R1 incident on the reflection surface 30a from the road surface, in the Y-axis negative direction, and condenses the reflected light R1 on the light-receiving surface of the photodetector 40. The photodetector 40 is implemented by a photodiode, for example. As the photodetector 40, a photodiode that has a detection sensitivity in an infrared waveband (e.g., 900 to 1800 nm) can be used. When the photodetector 40 has a detection sensitivity also in a visible light waveband, a filter that allows transmission therethrough of the reference wavelength, the absorption wavelength 1, and the absorption wavelength 2, which are the emission wavelengths of the light sources 21a, 21b, and 21c, respectively, and that blocks the visible light waveband, may be disposed before the photodetector 40. The photodetector 40 may be implemented by an avalanche photodiode.

The photodetector 40 receives the reflected lights R1, which are the illumination lights L1 emitted from the light sources 21a, 21b, and 21c and reflected by the road surface, and outputs electric signals based on the amounts of the received lights. The photodetector 40 is installed on the upper surface of the circuit board 50. The photodetector 40 is disposed below the exit of the through hole 30b.

In the present embodiment, the light sources 21a, 21b, and 21c are driven so as to emit light in a pulsed manner in a time-division manner. Therefore, the photodetector 40 receives, in a time-division manner, the reflected lights R1 based on the illumination lights L1 from the light sources 21a, 21b, and 21c, and outputs electric signals according to the amounts of the respective received reflected lights R1. On the basis of the electric signal according to each reflected light R1 and outputted from the photodetector 40, the type (the state of moisture) of a deposit on the road surface is determined. The deposit determination process will be described later with reference to FIG. 7.

The light blocking member 60 has a circular light blocking mask 60a at a position directly above the photodetector 40. The light blocking mask 60a is supported on the light blocking member 60 by four beam portions 60b. In a plan view, the size of the light blocking mask 60a is substantially equal to the size of the exit of the through hole 30b which is formed in the condenser mirror 30. An infrared absorber 60c which absorbs infrared light is attached to the upper surface of the light blocking mask 60a. For example, a paint containing the infrared absorber 60c is applied to the upper surface of the light blocking mask 60a. Alternatively, a sheet coated with the infrared absorber 60c is attached to the upper surface of the light blocking mask 60a.

When a part of the illumination light L1 emitted from the light source part 20 is scattered at the exit of the through hole 30b, the light blocking mask 60a blocks the scattered light from reaching the photodetector 40. That is, the scattered light traveling from the exit of the through hole 30b toward the photodetector 40 is incident on the upper surface of the light blocking mask 60a and absorbed by the infrared absorber 60c. The infrared absorber 60c does not have to be attached to the upper surface of the light blocking mask 60a. In this case as well, the scattered light traveling from the exit of the through hole 30b toward the photodetector 40 is blocked by the light blocking mask 60a.

It is preferable that the beam portions 60b supporting the light blocking mask 60a are formed in a thin line shape such that the reflected light R1 condensed on the light-receiving surface of the photodetector 40 through the outside of the light blocking mask 60a is prevented from being blocked as much as possible. In addition, the light blocking mask 60a does not necessarily have to be supported by the beam portions 60b. For example, a transparent plate may be disposed on the upper surface of the light blocking member 60, and the light blocking mask 60a may be attached to the transparent plate. In this case, it is preferable to apply an AR coat to the upper surface and the lower surface of the transparent plate.

In the configuration of FIG. 2 and FIG. 3, the condenser mirror 30, the circuit board 50, and the light blocking member 60 are installed on a support member 14 which is fixed to the housing 12. That is, the condenser mirror 30 is installed on the support member 14 by fixing a back plate portion 30c to the front surface of a wall plate portion 14a of the support member 14. In addition, the circuit board 50 is fixed to the lower surface of a front frame 14b of the support member 14, and the light blocking member 60 is fixed to the front surface of the wall plate portion 14a of the support member 14. Furthermore, the light source part 20 is fixed to the back surface of the wall plate portion 14a of the support member 14 in a state of being held by a holder. The circular opening 14c for passing the illumination light L1 is formed in the wall plate portion 14a. Accordingly, the assembly of the internal structure of the moisture sensing device 1 is completed.

<Configuration of Circuit Part>

Figure 5:
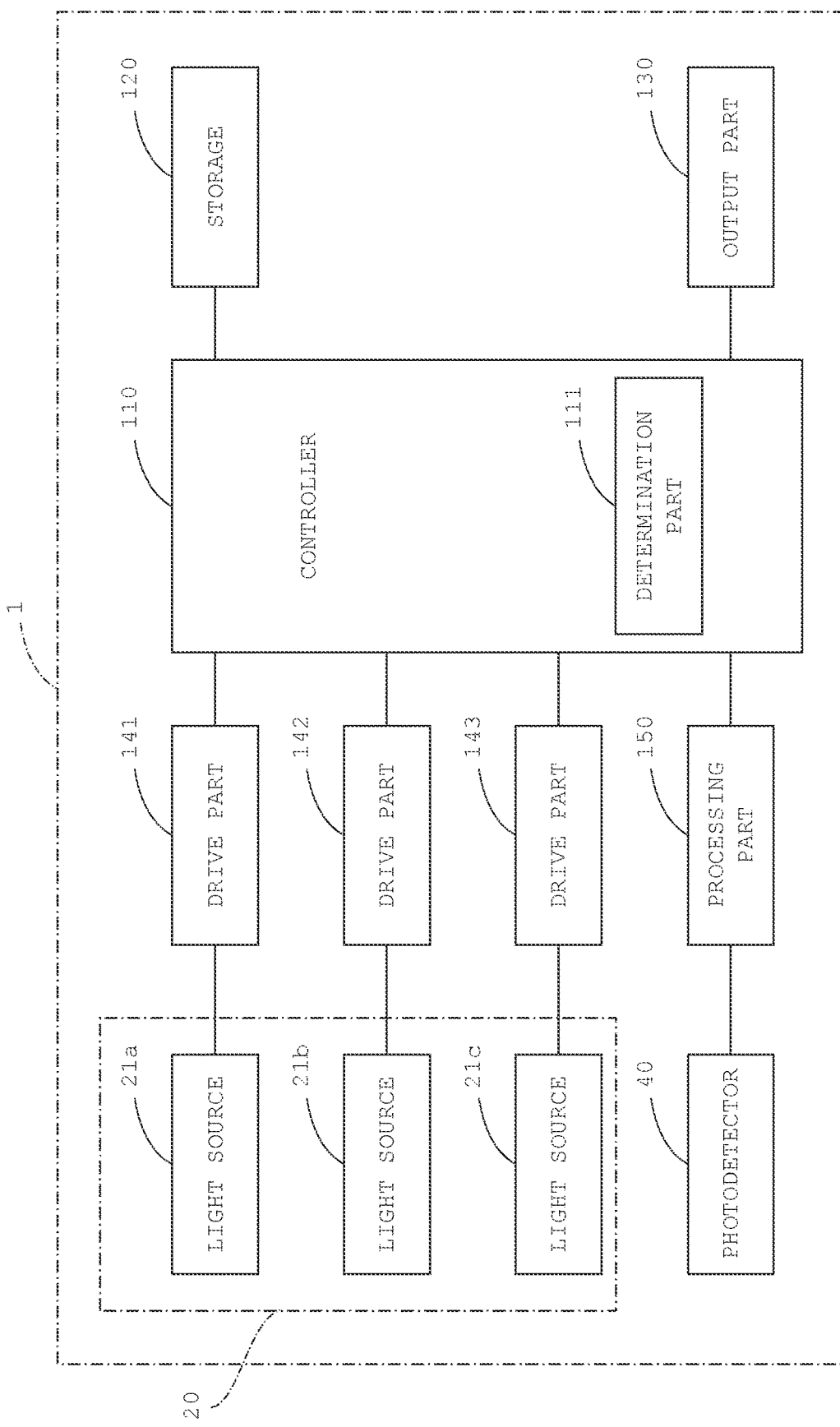
FIG. 5 is a block diagram showing a configuration of a circuit part of the moisture sensing device according to Embodiment 1.

FIG. 5 is a block diagram showing a configuration of a circuit part of the moisture sensing device 1.

The moisture sensing device 1 includes: a controller 110; a storage 120; an output part 130; three drive parts 141, 142, 143; and a processing part 150, in addition to the light sources 21a, 21b, and 21c and the photodetector 40 shown in FIG. 1.

The controller 110 is implemented by a CPU or a microcomputer, for example. The controller 110 performs control of components in the moisture sensing device 1, in accordance with a control program stored in the storage 120. As a function realized by the control program, a determination part 111 is provided in the controller 110. The determination part 111 determines the type (water, snow, ice) of the deposit on the road surface on the basis of a detection signal from the photodetector 40. The determination part 111 may be implemented as hardware, not as a function realized by the control program.

The storage 120 includes a memory, stores the control program, and is used as a work region during control processing. The output part 130 outputs a determination result of the determination part 111. The output part 130 may be a display part such as a monitor provided to the moisture sensing device 1, or may be a communication module for transmitting a determination result of the determination part 111 to an external processing device such as a server.

The drive parts 141, 142, 143 drive the light sources 21a, 21b, and 21c, respectively, in accordance with control from the controller 110. The processing part 150 converts an electric signal inputted from the photodetector 40 into a digital signal and takes a logarithm thereof, and outputs the logarithm to the controller 110. The controller 110 determines the type (the state of moisture) of the deposit on the road surface on the basis of a detection signal inputted from the processing part 150. This determination is performed by the determination part 111 as described above.

<Determination Method>

Next, a determination method for the type of a deposit is described.

Figure 6:
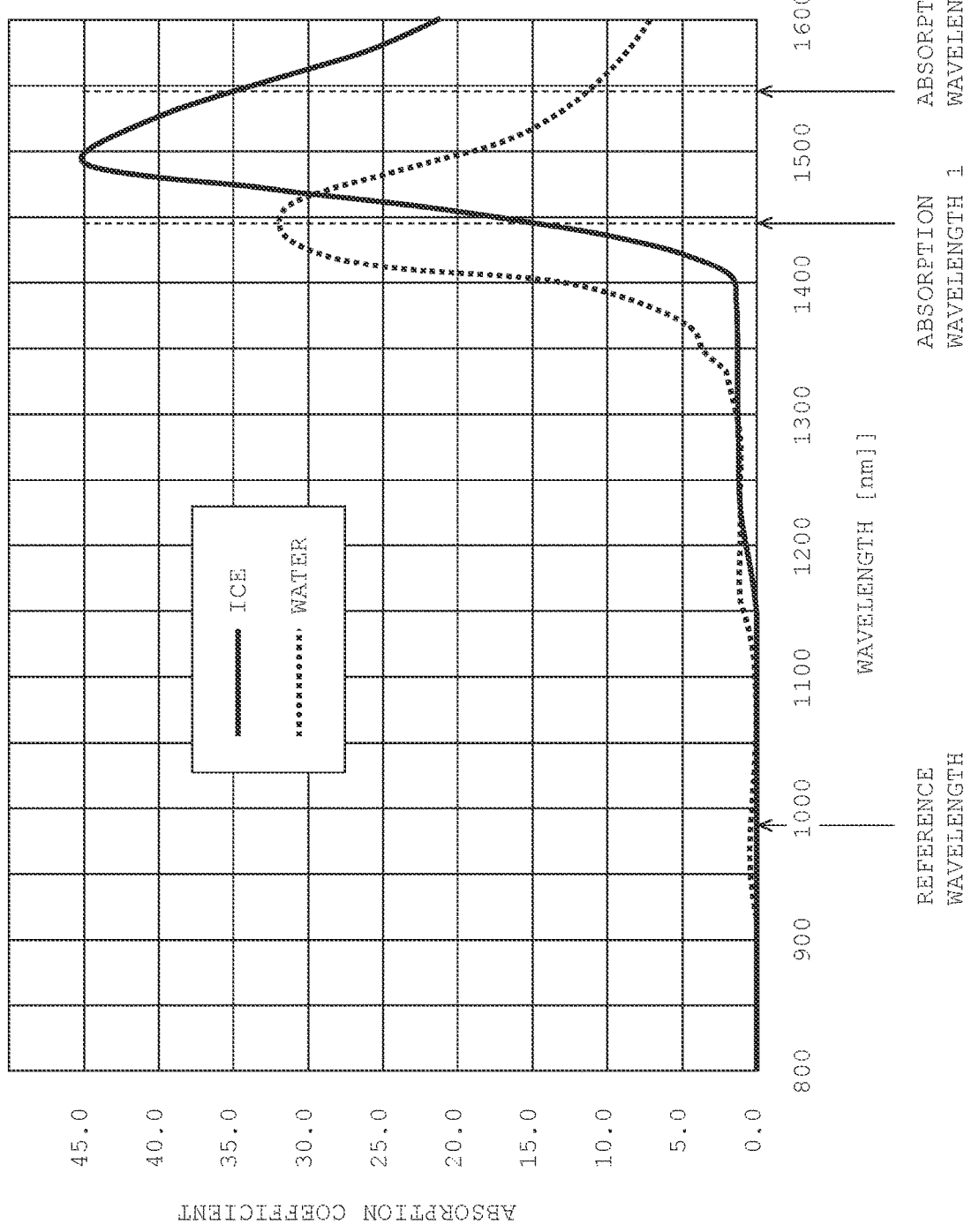
FIG. 6 is a graph showing absorption coefficient of light at water, according to Embodiment 1.

FIG. 6 is a graph showing absorption coefficient of light at water and ice.

In FIG. 6, the reference wavelength, the absorption wavelength 1, and the absorption wavelength 2 set as the emission wavelengths of the light sources 21a, 21b, and 21c are indicated by arrows, respectively.

As shown in FIG. 6, the absorption coefficients of the reference wavelength with respect to water and ice are smaller than the absorption coefficients of the absorption wavelength and the absorption wavelength 2. That is, illumination light L1 having the reference wavelength is less absorbed by water and ice than illumination lights L1 having the absorption wavelength 1 and the absorption wavelength 2. Therefore, illumination light L1 (the reference wavelength) emitted from the light source 21a is easily reflected by a road surface even when moisture (water, ice, snow) is present in an irradiation region on the road surface, and the amount of the reflected light R1 of the illumination light L1 (the reference wavelength) received by the photodetector 40 is large. On the other hand, as for the absorption wavelengths 1, 2 of lights emitted from the light sources 21b, 21c, absorption coefficients by water and ice are large. Therefore, when there is moisture in the irradiation region, illumination lights L1 having the absorption wavelengths 1, 2 are absorbed by the moisture, and the amount of reflected lights R1 having the absorption wavelengths 1, 2 and received by the photodetector 40 are small.

Thus, when detection signals with respect to the illumination lights L1 having the absorption wavelengths 1, 2 are normalized by a detection signal with respect to the illumination light L1 having the reference wavelength which is less likely to be influenced by moisture, noise components such as scattering due to the shape of the road surface can be suppressed.

In the present embodiment, using the difference in absorption coefficient between the absorption wavelength 1 and the absorption wavelength 2, discernment between water and ice is performed. That is, as for the absorption wavelength 1 (1450 nm), the absorption coefficient by water is large relative to the absorption coefficient by ice, and as for the absorption wavelength 2 (1550 nm), the absorption coefficient by ice is large relative to the absorption coefficient by water. Therefore, by taking the ratio of detection signals corresponding to the absorption wavelength 1 and the absorption wavelength 2, it is possible to discern whether the moisture is water or ice, when moisture is present at an irradiation position.

Figure 7:
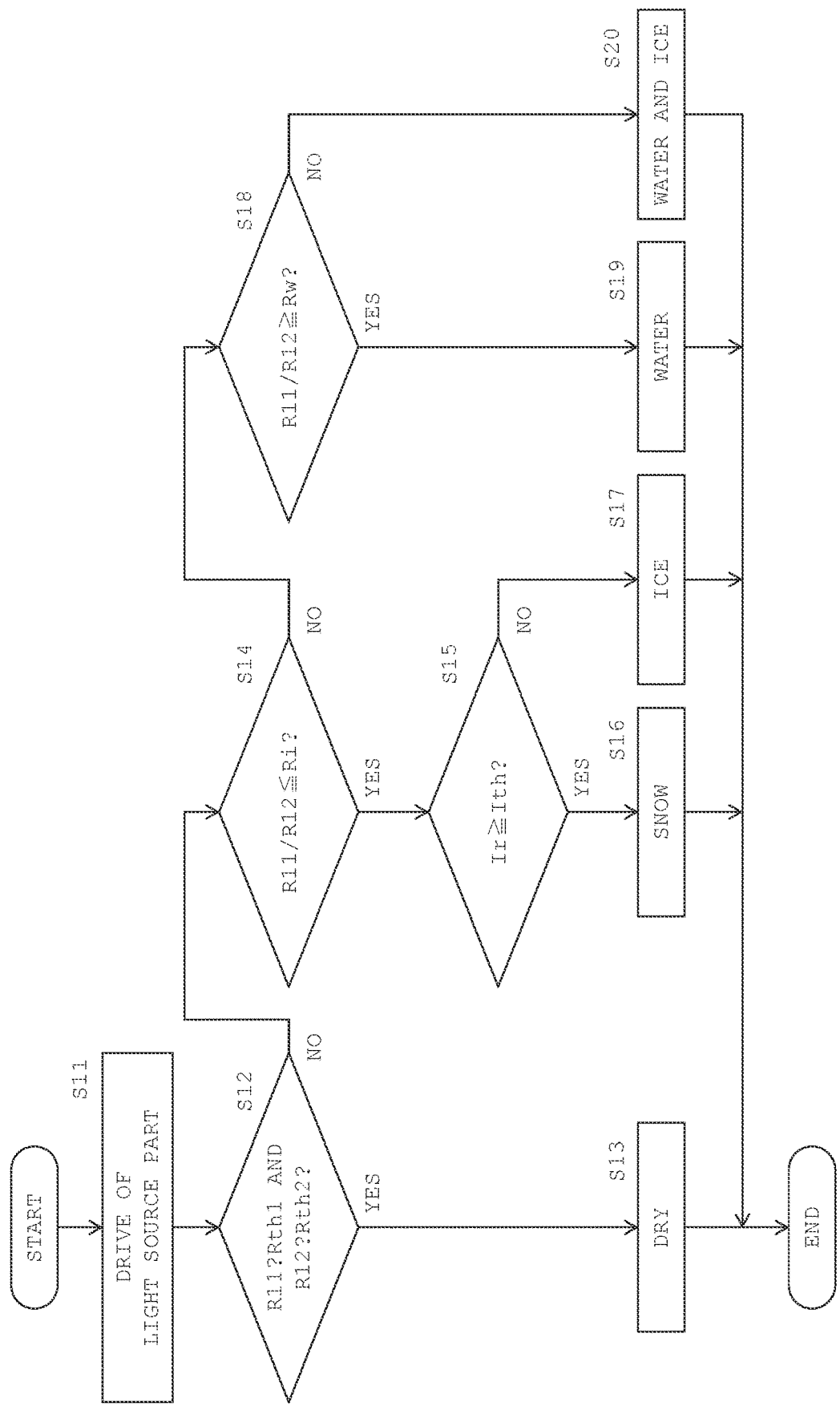
FIG. 7 is a flow chart showing a determination process performed by the moisture sensing device according to Embodiment 1.

FIG. 7 is a flow chart showing a determination process of the type of a deposit performed by the controller 110 (the determination part 111).

First, the controller 110 drives the light source part 20 (S11). Specifically, via the drive parts 141, 142, 143, the controller 110 causes the light sources 21a, 21b, and 21c to emit illumination lights L1 in a time-division manner. Then, the controller 110 obtains, via the processing part 150, a detection signal outputted from the photodetector 40 in accordance with the drive of the light source 21a, a detection signal outputted from the photodetector 40 in accordance with the drive of the light source 21b, and a detection signal outputted from the photodetector 40 in accordance with the drive of the light source 21c.

Next, the determination part 111 of the controller 110 determines the state of the irradiation position on the basis of the intensity of the detection signal corresponding to the reference wavelength, the intensity of the detection signal corresponding to the absorption wavelength 1, and the intensity of the detection signal corresponding to the absorption wavelength 2.

Specifically, when a value R11 obtained through logarithmic conversion of the ratio of the intensity of the detection signal corresponding to the absorption wavelength 1 relative to the intensity of the detection signal corresponding to the reference wavelength is not less than a threshold Rth1, and a value R12 obtained through logarithmic conversion of the ratio of the intensity of the detection signal corresponding to the absorption wavelength 2 relative to the intensity of the detection signal corresponding to the reference wavelength is not less than a threshold Rth2 (S12: YES), the determination part 111 determines that moisture is not present at the irradiation position (the irradiation position is dry).

Here, the threshold Rth1 is a value obtained by subtracting the value of the absorption coefficient at the absorption wavelength 1 (1450 nm) with respect to water from the value of the absorption coefficient at the reference wavelength (980 nm) with respect to water, and multiplying the resultant value by a doubled value of a thickness at which water is determined to be present. For example, when water having a thickness of not less than 10 μm is sensed, the value of Rth1 is −0.062. The threshold Rth2 is a value obtained by subtracting the value of the absorption coefficient at the absorption wavelength 2 (1550 nm) with respect to ice from the value of the absorption coefficient at the reference wavelength (980 nm) with respect to ice, and multiplying the resultant value by a doubled value of a thickness at which ice is determined to be present. For example, when ice having a thickness of not less than 10 μm is sensed, the value of Rth2 is −0.069.

When the determination in step S12 is NO, the determination part 111 determines that moisture is present at the irradiation position, and advances the process to step S14.

In step S14, the determination part 111 calculates the ratio of the value R11 to the value R12, and determines whether or not the obtained value is not greater than a threshold Ri. Here, the value of the threshold Ri is the ratio of a value obtained by subtracting the absorption coefficient at the reference wavelength (980 nm) from the absorption coefficient at the absorption wavelength 1 (1450 nm) at ice, and a value obtained by subtracting the absorption coefficient at the reference wavelength (980 nm) from the absorption coefficient at the absorption wavelength 2 (1550 nm) at ice.

When the ratio of the value R11 to the value R12 is not greater than the threshold Ri (S14: YES), the determination part 111 determines that only ice or snow is present at the irradiation position, and advances the process to step S15. When the ratio of the value R11 to the value R12 exceeds the threshold Ri (S14: NO), the determination part 111 determines that water, or water and ice is present at the irradiation position, and advances the process to step S18.

In step S15, the determination part 111 determines whether or not a received-light intensity Ir at the reference wavelength is not less than a threshold Ith. Here, when the received-light intensity Ir is not less than the threshold Ith (S15: YES), the determination part 111 determines that snow is present at the irradiation position (S16). Meanwhile, when the received-light intensity Ir is less than the threshold Ith (S15: NO), the determination part 111 determines that ice is present at the irradiation position (S17). Here, after the determination part 111 has determined that snow or ice is present, the controller 110 may measure the thickness thereof from the values of the detection signals corresponding to the reference wavelength and the absorption wavelength 1.

In step S18, the determination part 111 calculates the ratio of the value R11 to the value R12, and determines whether or not the obtained value is not less than a threshold Rw. When the ratio of the value R11 to the value R12 is not less than the threshold Rw (S18: YES), the determination part 111 determines that water is present at the irradiation position (S19). Here, after the determination part 111 has determined that water is present at the irradiation position, the controller 110 may further measure the thickness of the water from the values of the detection signals corresponding to the reference wavelength and the absorption wavelength 2.

Meanwhile, when the ratio of the value R11 to the value R12 is less than the threshold Rw (S18: NO), i.e., when Ri<R11/R12<Rw is satisfied, the determination part 111 determines that a mixture of water and ice is present at the irradiation position (S20). Here, the controller 110 may compare the value of (R11/R12−Ri) and the value of (Rw−R11/R12) with each other to calculate the proportion of water and ice present at the irradiation position, thereby measuring the thickness of the layer of the mixture of water and ice from the proportion and the values of the detection signals corresponding to the reference wavelength, the absorption wavelength 1, and the absorption wavelength 2.

<Method for Forming Reflection Surface>

Next, a method for forming the reflection surface 30a of the condenser mirror 30 will be described.

Figure 8:
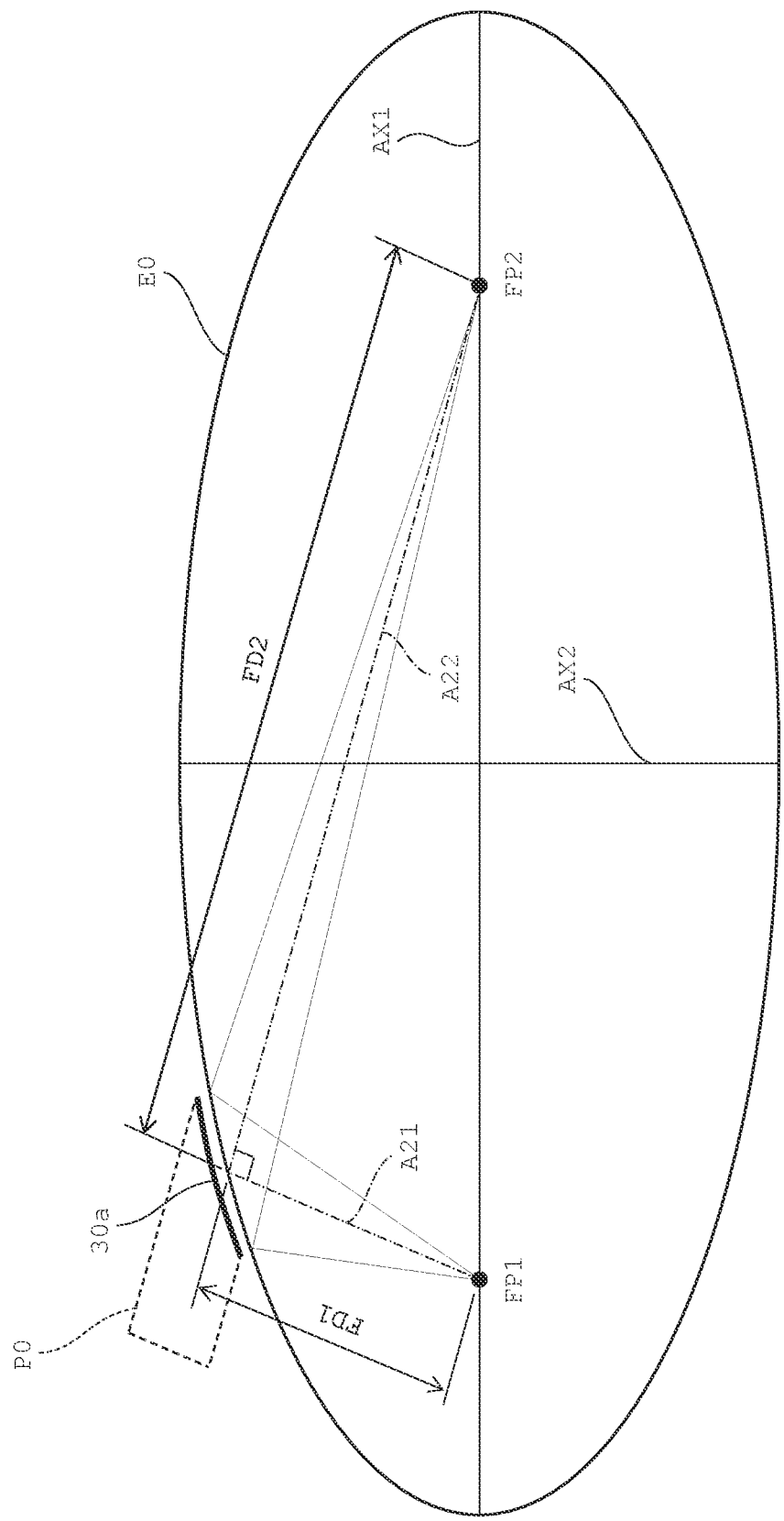
FIG. 8 is a diagram for illustrating a method for forming a reflection surface according to Embodiment 1.

FIG. 8 is a diagram for illustrating the method for forming the reflection surface 30a.

As shown in FIG. 8, in the case where one ridge of the reflection surface 30a has a shape along a part of a predetermined ellipse E0, light emitted from a first focal position FP1 on a major axis AX1 of the ellipse E0 is condensed to a second focal position FP2 on the major axis AX1 by the reflection surface 30a. Conversely, light emitted from the second focal position FP2 is condensed to the first focal position FP1 by the reflection surface 30a.

Here, an optical axis A21 extending from the reflection surface 30a toward the first focal position FP1 and an optical axis A22 extending from the reflection surface 30a toward the second focal position FP2 are perpendicular to each other. In addition, a first focal distance FD1 to the first focal position FP1 and a second focal distance FD2 to the second focal position FP2 change according to the ratio of the major axis AX1 to a minor axis AX2 of the ellipse E0. In other words, the ratio of the major axis AX1 to the minor axis AX2 changes according to the lengths of the first focal distance FD1 and the second focal distance FD2, and the shape of the ellipse E0 also changes. Accordingly, the shape of the ridge of the reflection surface 30a also changes.

In Embodiment 1, a road surface (sensing surface) is set in the direction from the reflection surface 30a toward the second focal position FP2, and the detection surface of the photodetector 40 is set in the direction from the reflection surface 30a toward the first focal position FP1. Therefore, the first focal distance FD1 is set to around the distance between the reflection surface 30a and the photodetector 40 in the moisture sensing device 1, and the second focal distance FD2 is set to around the distance between the reflection surface 30a and the road surface (sensing region). For example, the first focal distance FD1 is set to about 50 mm, and the second focal distance FD2 is set to about several meters to ten-odd meters. In this case, the ellipse E0 has a significantly larger ratio of the major axis AX1 to the minor axis AX2 than that in the case of FIG. 8.

In Embodiment 1, the shape of the reflection surface 30a is set to a cross-sectional shape obtained by cutting out a quadrangular prism (columnar body) P0 extending in a direction along the optical axis A22, with a spheroid whose rotation axis is the major axis AX1 including the first focal position FP1 and the second focal position FP2. Two opposing side surfaces of the quadrangular prism P0 are parallel to a plane including the optical axes A21 and A22, and the other two opposing side surfaces of the quadrangular prism P0 are perpendicular to the plane including the optical axes A21 and A22. The central axis of the quadrangular prism P0 coincides with the optical axis A22 extending toward the second focal position FP2. The optical axis A21 and the optical axis A22 in FIG. 8 correspond to the optical axis A2 and the optical axis A10 in FIG. 3, respectively.

By setting the shape of the reflection surface 30a as described above, the reflected light R1 generated near the second focal position FP2 can be efficiently condensed on the light-receiving surface of the photodetector 40 which is disposed near the first focal position FP1. That is, a greater amount of the reflected light R1 can be condensed on the photodetector 40 than in the case where the reflection surface 30a is set to a parabolic surface that condenses collimated light from infinity, on the light-receiving surface of the photodetector 40.

<Method for Adjusting Reflection Surface and Light-Receiving Surface>

Next, a method for adjusting the reflection surface 30a and the light-receiving surface of the photodetector 40 will be described.

Here, it is assumed that a distance measurement range is set to 2 to 15 m. The distance measurement range is a variation range of the distance to the sensing region. For example, in the case where the moisture sensing device 1 is installed on a utility pole or the like, the range of the distance, to the sensing region (road surface), which can be varied according to the installation state (the height of the installation position or the projection direction) of the moisture sensing device 1, is the distance measurement range.

The inventors of the present application conducted a study for a preferable method for adjusting the reflection surface 30a and the light-receiving surface of the photodetector 40 with respect to the distance measurement range from various viewpoints on the basis of simulation. Hereinafter, methods for adjusting the reflection surface 30a and the light-receiving surface of the photodetector 40 based on this study will be described together with the simulation results.

(1) Adjustment Method 1

In Adjustment Method 1, the second focal position FP2 shown in FIG. 8 is set to a distance position (for example, 4 m) between the farthest distance position (15 m) and the nearest distance position (2 m) in the distance measurement range, and the light-receiving surface of the photodetector 40 is positioned at the first focal position FP1. In addition, the size of the light-receiving surface is set such that the spot size, on the light-receiving surface, of the reflected light R1 reflected at the farthest distance position is equal to or smaller than the size of the light-receiving surface.

FIG. 9A to FIG. 9C are each a ray diagram obtained by simulation of a state of the reflected light R1 incident on a light-receiving surface 40a of the photodetector 40 when the reflection surface 30a and the light-receiving surface 40a of the photodetector 40 are formed according to conditions of Adjustment Method 1.

FIG. 9A to FIG. 9C show rays of the reflected lights R1 taken into the reflection surface 30a and condensed on the photodetector 40, out of the reflected lights R1 reflected and diffused at points where the distance from the reflection surface 30a is 15 m, 4 m, and 2 m (positions on a straight line including the optical axis A22 in FIG. 8), respectively.

In this simulation, the shape of the reflection surface 30a was formed with the first focal distance FD1 and the second focal distance FD2 shown in FIG. 8 being set to 50 mm and 4 m, respectively. In addition, in FIG. 2, the right, left, upper, and lower widths of the reflection surface 30a when viewed from the Z-axis positive side were each set to 52 mm. That is, the widths of the four side surfaces of the columnar portion 30d, which is a quadrangular prism, were each set to 52 mm. In addition, the diameter of the through hole 30b when viewed from the Z-axis positive side was set to 5 mm. Furthermore, the light-receiving surface 40a of the photodetector 40 was set to a circle having a diameter of 1 mm. Moreover, the light-receiving surface 40a of the photodetector 40 was set at the first focal position FP1.

In these conditions, as shown in FIG. 9B, the reflected light R1 from the reflection position at a distance of 4 mm is focused on the light-receiving surface 40a. In addition, in this case, as shown in FIG. 9A, the position at which the reflected light R1 from the reflection position at a distance of 15 m (the farthest distance in the distance measurement range) is converged to the minimum beam diameter is closer to the reflection surface 30a side than to the light-receiving surface 40a, but all the reflected light R1 taken into the reflection surface 30a is incident on the light-receiving surface 40a. Furthermore, in this case, as shown in FIG. 9C, the position at which the reflected light R1 from the reflection position at a distance of 2 mm (the nearest distance in the distance measurement range) is converged to the minimum beam diameter is farther from the reflection surface 30a than from the light-receiving surface 40a, but all the reflected light R1 taken into the reflection surface 30a is incident on the light-receiving surface 40a.

As described above, when the reflection surface 30a and the light-receiving surface 40a are set according to the conditions of Adjustment Method 1, even when the sensing region is set at any distance position in the distance measurement range, all the reflected light R1 taken into the reflection surface 30a can be made incident on the light-receiving surface 40a. Therefore, the reflected light R1 can be efficiently condensed on the light-receiving surface 40a.

FIG. 9D is a graph showing a relationship between the distance to the sensing region and the amount of light received by the photodetector 40 based on the above simulation when the reflection surface 30a and the light-receiving surface 40a are set according to the conditions of Adjustment Method 1.

In FIG. 9D, the horizontal axis indicates the distance to the sensing region (the distance between the reflection surface 30a and the sensing region), and the vertical axis indicates a relative amount of the received reflected light R1 when the amount of the light received when the distance to the sensing region is 15 mm (the farthest distance in the distance measurement range) is regarded as 1.

Since the reflected light of the illumination light L1 is diffused in the sensing region, the amount of the reflected light R1 taken into the reflection surface 30a is inversely proportional to the square of the distance to the sensing region. Meanwhile, according to the conditions of Adjustment Method 1, as shown in FIG. 9A to FIG. 9C, at any distance position in the distance measurement range, all the reflected light R1 taken into the reflection surface 30a is incident on the light-receiving surface 40a. Therefore, the amount of the reflected light R1 (received light amount) incident on the light-receiving surface 40a is inversely proportional to the square of the distance to the sensing region.

Therefore, as shown in FIG. 9D, the amount of the received reflected light increases sharply as the distance to the sensing region becomes shorter. Here, the relative amount of the received light at the nearest distance position (2 m) is about 56 times the relative amount of the received light at the farthest distance position (15 m). Therefore, the processing part 150 (see FIG. 5) which processes a signal from the photodetector 40 needs to include a detection circuit that can cover a range Rn1 of about 56 times. In this case, the detection circuit needs to include a gain switching circuit, a gain adjusting circuit, etc.

Here, according to the conditions of Adjustment Method 1, as shown in FIG. 9D, the relative amount of the received light is significantly high in a near distance range. Therefore, in the case where the moisture sensing device 1 is used for the near distance range, the outputs of the light sources 21a, 21b, and 21c may be decreased as compared to those in the case of measuring a far distance range. Accordingly, the power consumption of the moisture sensing device 1 can be reduced, and the range Rn1 can be narrowed. Therefore, the gain switching circuit and the gain adjusting circuit can be omitted from the detection circuit.

In the above verification, as shown in FIG. 9A and FIG. 9C, the second focal distance FD2 and the size of the light-receiving surface 40a were set such that both the spot size, on the light-receiving surface 40a, of the reflected light R1 reflected at the farthest distance position and the spot size, on the light-receiving surface 40a, of the reflected light R1 reflected at the nearest distance position were equal to or smaller than the size of the light-receiving surface 40a. On the other hand, the second focal distance FD2 and the size of the light-receiving surface 40a may be set such that the spot size of the reflected light R1 reflected at the nearest distance position is larger than the size of the light-receiving surface 40a. By doing so, in the near distance range, a part of the reflected light R1 can be made to reach the outside of the light-receiving surface 40a, so that the amount of the received light in the near distance range can be reduced. Accordingly, the range Rn1 to be covered by the detection circuit can be narrowed, so that the detection circuit can be simplified.

(2) Adjustment Method 2

In Adjustment Method 2, the second focal position FP2 shown in FIG. 8 is set to the farthest distance position (15 m) in the distance measurement range, and the light-receiving surface of the photodetector 40 is positioned at the first focal position FP1. In addition, the light-receiving surface is set such that the size of the light-receiving surface is smaller than the spot size, on the light-receiving surface, of the reflected light R1 reflected at the nearest distance position.

FIG. 10A to FIG. 10C are each a ray diagram obtained by simulation of a state of the reflected light R1 incident on a light-receiving surface 40a of the photodetector 40 when the reflection surface 30a and the light-receiving surface 40a of the photodetector 40 are formed according to conditions of Adjustment Method 2.

FIG. 10A to FIG. 10C show rays of the reflected lights R1 taken into the reflection surface 30a and condensed on the photodetector 40, out of the reflected lights R1 reflected and diffused at points where the distance from the reflection surface 30a is 15 m, 4 m, and 2 m (positions on a straight line including the optical axis A22 in FIG. 8), respectively.

In this simulation, the shape of the reflection surface 30a was formed with the first focal distance FD1 and the second focal distance FD2 shown in FIG. 8 being set to 50 mm and 15 m, respectively. The other simulation conditions were set to be the same as those in the case of FIG. 9A to FIG. 9C.

In this case, as shown in FIG. 10A, the reflected light R1 from the reflection position at a distance of 15 mm (the farthest distance in the distance measurement range) is focused on the light-receiving surface 40a. In addition, as shown in FIG. 10B, the position at which the reflected light R1 from the reflection position at a distance of 4 m (a distance between the farthest distance and the nearest distance) is converged to the minimum beam diameter shifts downward with respect to the light-receiving surface 40a, but all the reflected light R1 taken into the reflection surface 30a is incident on the light-receiving surface 40a. Moreover, as shown in FIG. 10C, the position at which the reflected light R1 from the reflection position at a distance of 2 mm (the nearest distance in the distance measurement range) is converged to the minimum beam diameter further shifts with respect to the light-receiving surface 40a, whereby a part of the reflected light R1 taken into the reflection surface 30a reaches the outside of the light-receiving surface 40a.

FIG. 10D is a graph showing a relationship between the distance to the sensing region and the amount of light received by the photodetector 40 based on the above simulation when the reflection surface 30a and the light-receiving surface 40a are set according to the conditions of Adjustment Method 2. The vertical axis and the horizontal axis are the same as those of FIG. 9D.

According to the conditions of Adjustment Method 2, as shown in FIG. 10C, when the reflection position is the nearest distance position, a part of the reflected light R1 taken into the reflection surface 30a reaches the outside of the light-receiving surface 40a. Therefore, as shown in FIG. 10D, the rate of increase in the amount of the received reflected light R1 in the near distance range is lower than that in FIG. 9D. Here, the relative amount of the received light at the nearest distance position (2 m) is decreased to about 37 times the relative amount of the received light at the farthest distance position (15 m). Therefore, it is sufficient that the processing part 150 (see FIG. 5) which processes a signal from the photodetector 40 includes a detection circuit that can cover a range Rn2 of about 37 times. In this case, it may be possible to omit a gain switching circuit, a gain adjusting circuit, etc., from the detection circuit.

In the conditions of Adjustment Method 2 as well, similar to the case of Adjustment Method 1, in the case where the moisture sensing device 1 is used for the near distance range, adjustment may be performed such that the outputs of the light sources 21a, 21b, and 21c are decreased. Accordingly, the power consumption of the moisture sensing device 1 can be reduced, and the range Rn2 can be narrowed. Therefore, the gain switching circuit and the gain adjusting circuit can be omitted from the detection circuit.

Also, in the conditions of Adjustment Method 2, since the reflected light R1 reflected from the farthest distance position (15 m) is focused on the light-receiving surface 40a of the photodetector 40, the size of the light-receiving surface 40a can be made smaller than that in Adjustment Method 1. That is, even if the size of the light-receiving surface 40a is set smaller, all the reflected light R1 that has been reflected in the far distance range and taken into the light-receiving surface 40a in a small amount can be reliably made incident on the light-receiving surface 40a of the photodetector 40.

In the case where the size of the light-receiving surface 40a is adjusted to be smaller as described above, the amount of the reflected light R1 reaching the outside of the light-receiving surface 40a, out of the reflected light R1 from the near distance range, increases. Accordingly, the relative amount of the received light in the near distance range can be decreased, so that the range Rn2 can be further narrowed. Therefore, the gain switching circuit and the gain adjusting circuit can be omitted from the detection circuit.

In addition, if the light-receiving surface 40a is made smaller, the detection accuracy of the photodetector 40 can be enhanced, and the cost of the photodetector 40 can also be reduced.

(3) Adjustment Method 3

In Adjustment Method 3, the second focal position FP2 shown in FIG. 8 is set to the farthest distance position (15 m) in the distance measurement range, and the light-receiving surface of the photodetector 40 is positioned at a position shifted to the reflection surface 30a side with respect to the first focal position FP1. In addition, the light-receiving surface is set such that the spot size, on the light-receiving surface, of the reflected light R1 reflected at the farthest distance position is equal to the size of the light-receiving surface and the size of the light-receiving surface is smaller than the spot size, on the light-receiving surface, of the reflected light R1 reflected at the nearest distance position.

FIG. 11A to FIG. 11C are each a ray diagram obtained by simulation of a state of the reflected light R1 incident on a light-receiving surface 40a of the photodetector 40 when the reflection surface 30a and the light-receiving surface 40a of the photodetector 40 are formed according to conditions of Adjustment Method 3.

FIG. 11A to FIG. 11C show rays of the reflected lights R1 taken into the reflection surface 30a and condensed on the photodetector 40, out of the reflected lights R1 reflected and diffused at points where the distance from the reflection surface 30a is 15 m, 4 m, and 2 m (positions on a straight line including the optical axis A22 in FIG. 8), respectively.

In this simulation, the position of the photodetector 40 is different from that in the simulation conditions of FIG. 10A to FIG. 10C. In FIG. 11A to FIG. 11C, the photodetector disposed in FIG. 10A to FIG. 10C is shown as a photodetector 40'.

That is, in the simulation of FIG. 11A to FIG. 11C, the light-receiving surface 40a was located at a position shifted in the direction toward the reflection surface 30a with respect to the first focal position FP1. More specifically, the photodetector 40 was disposed such that a spot size (beam diameter) W1, on the light-receiving surface 40a, of the reflected light R1 reflected at the farthest distance position (15 m) was equal to the size (diameter) of the light-receiving surface 40a. The other simulation conditions were set to be the same as those in the case of FIG. 10A to FIG. 10C.

In this case, as shown in FIG. 11A, all the reflected light R1 from the reflection position at a distance of 15 mm (the farthest distance in the distance measurement range) is condensed on the light-receiving surface 40a. In addition, as shown in FIG. 11B, as the position at which the reflected light R1 from the reflection position at a distance of 4 m (the distance between the farthest distance and the nearest distance) is converged to the minimum beam diameter becomes farther from the light-receiving surface 40a, the spot size W1 becomes larger than the size of the light-receiving surface 40a, so that a part of the reflected light R1 taken into the reflection surface 30a reaches the outside of the light-receiving surface 40a. In addition, as shown in FIG. 11C, the position at which the reflected light R1 from the reflection position at a distance 2 m (the nearest distance in the distance measurement range) is converged to the minimum beam diameter becomes even farther from the light-receiving surface 40a, whereby the spot size W1 becomes even larger, and more portions of the reflected light R1 taken into the reflection surface 30a reach the outside of the light-receiving surface 40a.

FIG. 11D is a graph showing a relationship between the distance to the sensing region and the amount of light received by the photodetector 40 based on the above simulation when the reflection surface 30a and the light-receiving surface 40a are set according to the conditions of Adjustment Method 3. The vertical axis and the horizontal axis are the same as those of FIG. 9D.

According to the conditions of Adjustment Method 3, as shown in FIG. 11B and FIG. 11C, as the reflection position comes closer to the nearest distance position, the amount of the reflected light R1 reaching the outside of the light-receiving surface 40a increases. Therefore, as shown in FIG. 11D, the rate of increase in the amount of the received reflected light R1 in the near distance range is much lower. Here, the relative amount of the received light at the nearest distance position (2 m) is decreased to about 11 times the relative amount of the received light at the farthest distance position (15 m). Therefore, it is sufficient that the processing part 150 (see FIG. 5) which processes a signal from the photodetector 40 includes a detection circuit that can cover a range Rn3 of about 11 times. In this case, a gain switching circuit, a gain adjusting circuit, etc., can be omitted from the detection circuit.

Also, according to the conditions of Adjustment Method 3 as well, all the reflected light R1 reflected from the farthest distance position (15 m) is condensed on the light-receiving surface 40a of the photodetector 40, so that all the reflected light R1 that has been reflected at the farthest distance position and taken into the light-receiving surface 40a in a small amount can be reliably made incident on the light-receiving surface 40a of the photodetector 40. Therefore, moisture sensing at the farthest distance position can be performed more accurately.

In the above simulation conditions, the photodetector 40 was disposed such that the spot size W1, on the light-receiving surface 40a, of the reflected light R1 reflected at the farthest distance position (15 m) was equal to the size of the light-receiving surface 40a. However, the position of the photodetector 40 or the size of the light-receiving surface 40a may be set such that the spot size W1, on the light-receiving surface 40a, of the reflected light R1 reflected at the farthest distance position (15 m) is slightly smaller than the size of the light-receiving surface 40a. Accordingly, the reflected light R1 in the far distance range can be reliably made incident on the light-receiving surface 40a of the photodetector 40, and moisture sensing in the far distance range can be performed accurately.

<System Configuration Example>

Next, a system configuration example using the moisture sensing device 1 according to Embodiment 1 described above is described.

Figure 12:
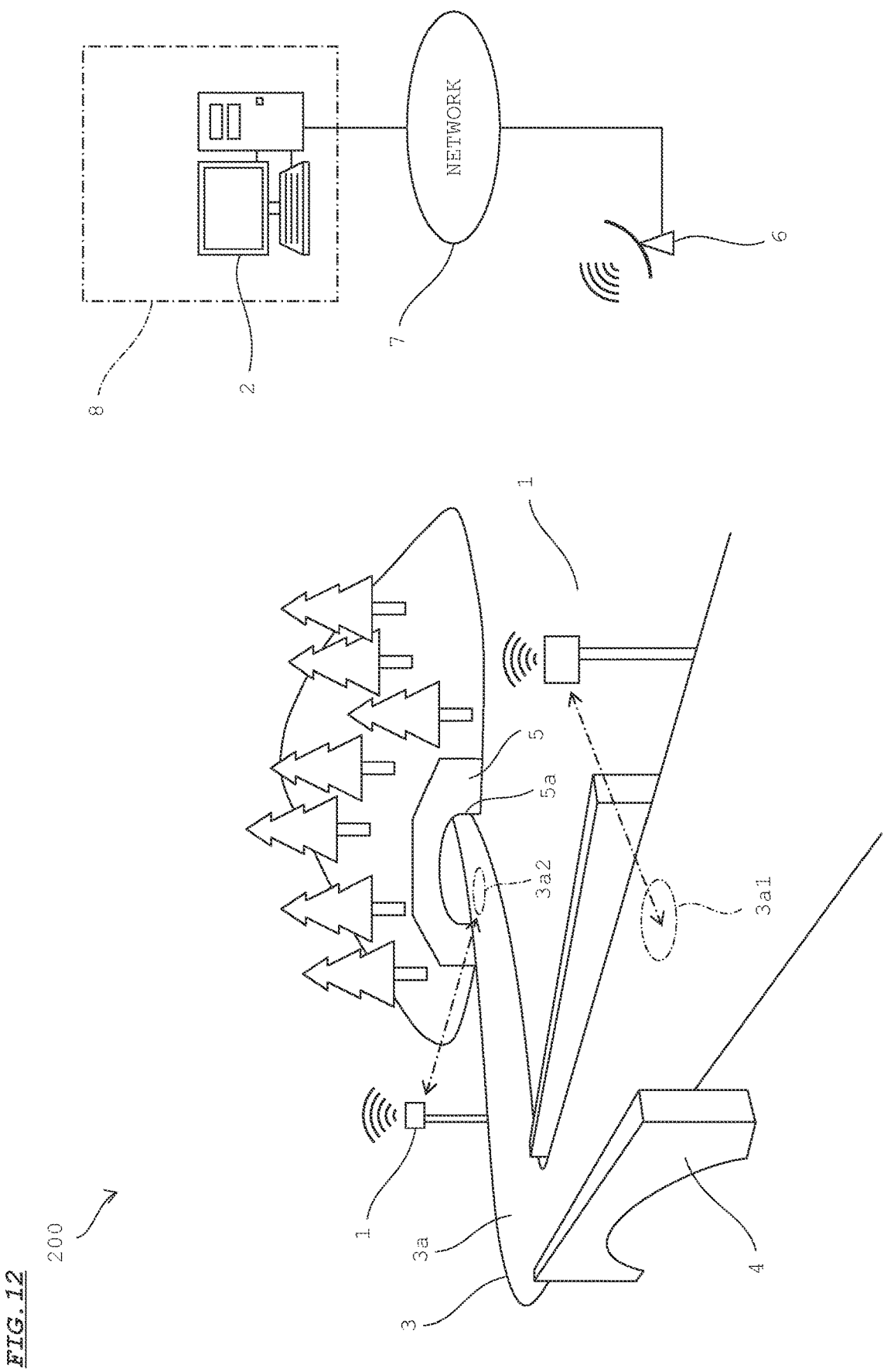
FIG. 12 schematically shows a configuration of a road surface information delivery system according to Embodiment 1.

FIG. 12 schematically shows a configuration of a road surface information delivery system 200.

The road surface information delivery system 200 includes moisture sensing devices 1 and a management server 2. In the example in FIG. 12, a road 3 extends through a bridge 4 and an exit 5a of a tunnel 5, and is continued to the inside of the tunnel 5.

Each moisture sensing device 1 is installed via a pole or the like on a lateral side of the road 3. The moisture sensing device 1 is also installed to an outdoor lamp, a wall surface, or the like installed on a lateral side of the road 3. The moisture sensing device 1 detects the state of a road surface 3a of the road 3. In FIG. 12, two moisture sensing devices 1 are shown. The moisture sensing device 1 on the near side senses the state of a sensing region 3a1 of the road surface 3a positioned on the bridge 4. The moisture sensing device 1 on the far side senses the state of a sensing region 3a2 of the road surface 3a positioned near the exit 5a of the tunnel 5. The distances between the respective moisture sensing devices 1 and the sensing regions 3a1, 3a2 are different from each other. Each of the distances is within the distance measurement range. The moisture sensing device determines the state (the type, thickness, etc., of a deposit) of moisture in each sensing target region of the road surface 3a, and transmits a determination result to the management server 2 via a base station 6 and a network 7.

The base station 6 is installed so as to include the moisture sensing devices 1 in a communicable range, and is configured to be wirelessly communicable with the moisture sensing devices 1. In this case, the output part 130 in FIG. 3 is implemented by a communication module. The base station 6 is connected to the network 7. The network 7 is the Internet, for example.

The management server 2 is installed at a road surface status delivery center 8 or the like, and is connected to the network 7. On the basis of information regarding the road surface state delivered by the moisture sensing device 1, the management server 2 generates map information for making notification of the state of the road surface 3a, and delivers the generated map information to a vehicle or the like via the network 7 and the base station 6. The delivered map information is displayed on a display part of a car navigation system mounted on a vehicle. A driver can confirm the displayed content to understand the state of the road surface 3a of the traveling path. Accordingly, safety during traveling on the road surface 3a can be enhanced.

Other than this, the moisture sensing device 1 may be mounted on a vehicle. In this case, for example, the moisture sensing device 1 is installed in the vehicle such that illumination light L1 is applied to the road surface diagonally in front of the vehicle. The moisture sensing device 1 senses the road surface state in front of the vehicle, and causes the sensing result to be displayed in a navigation system of the vehicle. Sensing of the road surface state is performed also during traveling of the vehicle, and the sensing result is displayed at the navigation system at appropriate times. Accordingly, the driver can accurately understand the state of the road surface during the current traveling.

In this case, further, the sensing result of the road surface by the moisture sensing device 1 may be transmitted, together with information indicating the current traveling position, from the navigation system to the management server in FIG. 8, to be aggregated in the management server 2. Accordingly, on the basis of the aggregated sensing results of the road surface from vehicles, the management server 2 can generate finer map information indicating the state of the road. The driver can more accurately understand the state of the road that can be a traveling path.

Effects of Embodiment

According to Embodiment 1, the following effects are achieved.

As shown in FIG. 3, the optical axis A1 of the light source part 20 and the optical axis A2 of the condenser mirror 30 are aligned with each other in the range on the road surface side (sensing region side). Therefore, the reflected light R1, out of the reflected light reflected by the road surface (sensing region), that travels backward along the aligned optical axis A10 can be condensed on the photodetector 40 by the condenser mirror 30. Therefore, the angles of the illumination light L1 and the reflected light R1 with respect to the road surface do not need to be adjusted in accordance with the distance between the moisture sensing device 1 and the road surface, and even without such adjustment, the reflected light R1 from the road surface can be appropriately received by the photodetector 40.

As described with reference to FIG. 8, the reflection surface 30a of the condenser mirror 30 has a shape obtained by cutting out a columnar body (quadrangular prism P0) extending in the projection direction of the illumination light L1, with a spheroid whose rotation axis is a major axis. Therefore, by disposing the photodetector 40 in the direction toward the first focal position FP1 of the condenser mirror 30 with respect to the condenser mirror 30 and setting the sensing region in the direction toward the second focal position FP2 of the condenser mirror 30 with respect to the condenser mirror 30, the reflected light R1 from the sensing region can be efficiently guided to the photodetector 40. Therefore, the state of moisture on the sensing region can be more accurately sensed.

As shown in FIG. 3, the light blocking mask 60a for blocking the illumination light L1 scattered at the exit of the through hole 30b is provided between the exit of the through hole 30b and the photodetector 40. Accordingly, unnecessary light other than the reflected light R1 can be inhibited from being incident on the photodetector 40, and as a result, the accuracy of moisture sensing can be enhanced.

In Adjustment Method 2 shown in FIG. 10A to FIG. 10D and Adjustment Method 3 shown in FIG. 11A to FIG. 11D, the second focal position FP2 is set at the farthest distance position in the distance measurement range. Accordingly, the reflected light R1, from the farthest distance position, which is received in a very small amount can be efficiently condensed on the light-receiving surface 40a of the photodetector 40 by the reflection surface 30a. Therefore, the accuracy of moisture sensing can be enhanced.

In Adjustment Method 2 shown in FIG. 10A to FIG. 10D, the light-receiving surface 40a of the photodetector 40 is located at the first focal position FP1. Accordingly, all the reflected light R1 from the farthest distance position can be reliably condensed on the light-receiving surface 40a of the photodetector 40. Therefore, the accuracy of moisture sensing can be enhanced.

In Adjustment Method 3 shown in FIG. 11A to FIG. 11D, the light-receiving surface 40a of the photodetector 40 is located at such a position that the spot size W1 of the reflected light R1 reflected at the farthest distance position is equal to the size of the light-receiving surface 40a of the photodetector 40. Accordingly, all the reflected light R1 reflected at the farthest distance position can be condensed on the light-receiving surface 40a, and the amount of the reflected light R1 reaching the outside of the light-receiving surface 40a can be increased as the reflection position (sensing region) comes closer to the nearest distance position. Therefore, as shown in FIG. 11D, the range Rn3 of the received light amount can be significantly narrowed, and the configuration of the detection circuit for processing a signal from the photodetector 40 can be simplified.

In Adjustment Method 1 shown in FIG. 9A to FIG. 9D, the second focal position FP2 is set at a distance position (here, the distance position of 4 m) between the farthest distance position and the nearest distance position in the distance measurement range, and the size of the light-receiving surface 40a of the photodetector 40 is set such that the spot size, on the light-receiving surface 40a of the photodetector 40, of the reflected light R1 reflected at the farthest distance position (here, the distance position of 15 m) is equal to or smaller than the size of the light-receiving surface 40a. Accordingly, as shown in FIG. 9D, in the entirety of the distance measurement range, the reflected light R1 can be efficiently received. Therefore, when the sensing region is in the near distance range, measures to reduce the emission powers of the light sources 21a to 21c can be taken, and the power consumption can be reduced.

In Adjustment Method 2 shown in FIG. 10A to FIG. 10D and Adjustment Method 3 shown in FIG. 11A to FIG. 11D, the size of the light-receiving surface 40a of the photodetector 40 is smaller than the spot size, on the light-receiving surface 40a, of the reflected light reflected at the nearest distance position in the distance measurement range. Accordingly, in the near distance range from which the amount of the reflected light R1 taken into the reflection surface 30a is large, a part of the reflected light R1 reaches the outside of the light-receiving surface 40a. Therefore, as shown in FIG. 10D and FIG. 11D, the ranges Rn2 and Rn3 of the relative amount of the received light can be narrowed, and the configuration of the detection circuit for processing a signal from the photodetector 40 can be simplified.

As shown in FIG. 4A and FIG. 4B, the light source part 20 includes a plurality of the light sources 21a to 21c which emit lights having wavelengths different from each other, and the alignment optical system 20a (the mirror 23, the dichroic mirrors 24 and 25) which aligns the emission optical axes of these light sources 21a to 21c with each other. By aligning the emission optical axes of the light sources 21a to 21c with the optical axis A1 as described above, the optical axis A1 and the optical axis A2 of the condenser mirror 30 can be easily aligned with each other by the condenser mirror 30.

The moisture sensing device 1 includes the determination part 111 which determines a deposit on the sensing region on the basis of the detection signal from the photodetector 40. As shown in FIG. 7, the determination part 111 determines a deposit (snow, ice, water) on the road surface on the basis of the values R11, R12 obtained by normalizing the detection signals with respect to the two detection illumination lights L1 having the absorption wavelengths 1, 2 by the detection signal with respect to the reference illumination light L1 having the reference wavelength. Thus, when the detection signals with respect to the illumination lights L1 having the absorption wavelengths 1, 2 are normalized by the detection signals with respect to the illumination light L1 having the reference wavelength which is less likely to be influenced by moisture, noise components such as scattering due to the shape of the road surface can be suppressed.

Therefore, the state (the type of a deposit) of moisture on the road surface can be accurately determined.

<Modifications>

FIG. 13 is a perspective view showing a configuration of a moisture sensing device 1 according to a modification of Embodiment 1.

In the configuration of FIG. 13, the shape of a condenser mirror 31 is changed as compared to the configuration of FIG. 2. That is, in the configuration of FIG. 13, a columnar portion 31d of the condenser mirror 31 has a cylindrical shape. The columnar portion 31d projects in the projection direction of the illumination light L1. In the columnar portion 31d, a through hole 31b is formed along the central axis thereof. Similar to the case of the configuration of FIG. 2, a reflection surface 31a is formed by the method shown in FIG. 8. That is, the reflection surface 31a is formed by cutting out a cylinder having the same diameter as the columnar portion 31d, with a spheroid whose rotation axis is the major axis AX1. The functions of the through hole 31b and a back plate portion 31c are the same as the functions of the through hole 30b and the back plate portion 30c in the configuration of FIG. 2. The configuration other than the condenser mirror 31 is the same as the configuration of FIG. 2.

With the configuration of FIG. 13 as well, similar to Embodiment 1 described above, the reflection surface 31a and the light-receiving surface 40a of the photodetector 40 are set by Adjustment Methods 1 to 3. Accordingly, the same effects as those of Embodiment 1 described above can be achieved.

With the configuration of FIG. 13 as well, similar to Embodiment 1 described above, the optical axis A1 of the light source part 20 and the optical axis A2 of the condenser mirror 30 are aligned with each other in the range on the road surface side (sensing region side). Therefore, the reflected light R1, out of the reflected light reflected by the road surface (sensing region), that travels backward along the aligned optical axis A10 can be condensed on the photodetector 40 by the condenser mirror 30. Therefore, the angles of the illumination light L1 and the reflected light R1 with respect to the road surface do not need to be adjusted in accordance with the distance between the moisture sensing device 1 and the road surface, and even without such adjustment, the reflected light R1 from the road surface can be appropriately received by the photodetector 40.

In addition, with the configuration of FIG. 13 as well, the same effects as those of the corresponding configuration of FIG. 2 can be achieved.

In the configuration of FIG. 13, the reflection surface 31a is formed by cutting out a cylinder with a spheroid. Therefore, the area of the reflection surface 31a is decreased as compared to the case where the reflection surface 30a is formed by cutting out a quadrangular prism with a spheroid as in Embodiment 1 described above.

Figure 14C:
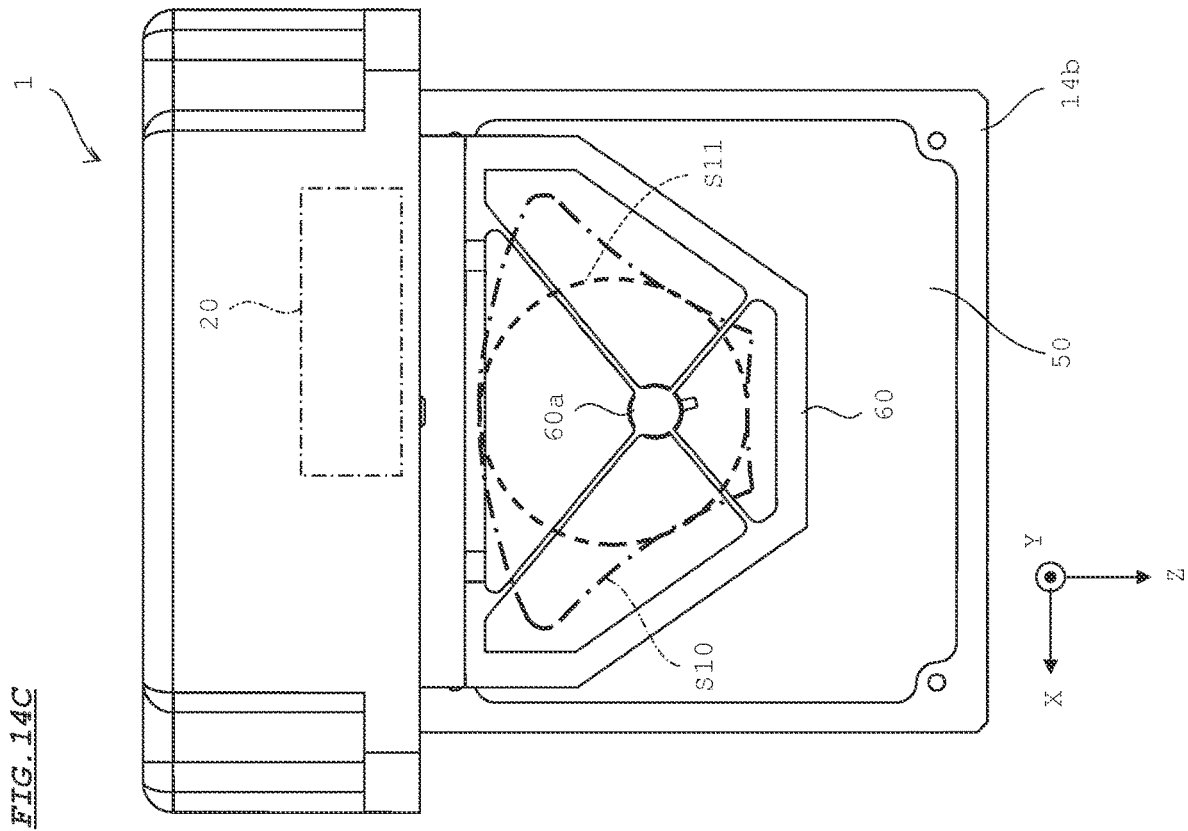
FIG. 14C shows light-condensing ranges, at the position of a light blocking mask, of reflected light condensed by the reflection surfaces of Embodiment 1 and the modification.
Figure 14A:
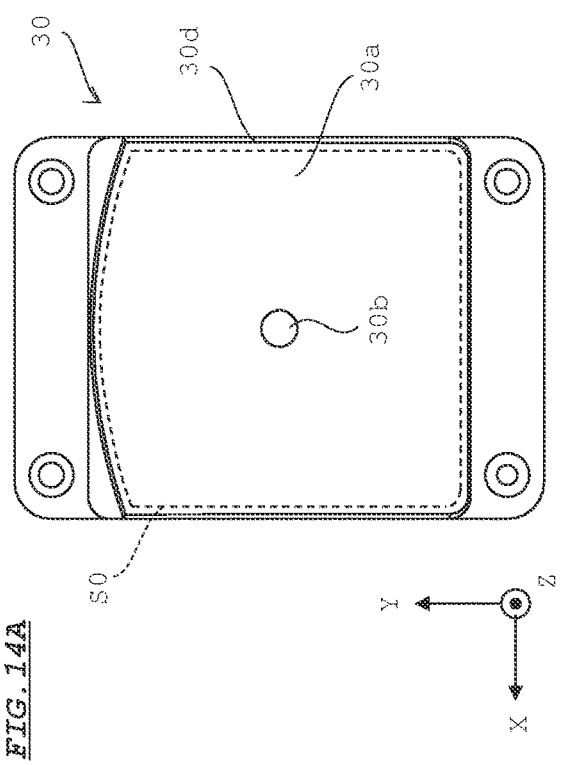
FIG. 14A and FIG. 14B are side views of condenser mirrors according to Embodiment 1 and the modification, respectively, as seen from the exit side of illumination light.
Figure 14B:
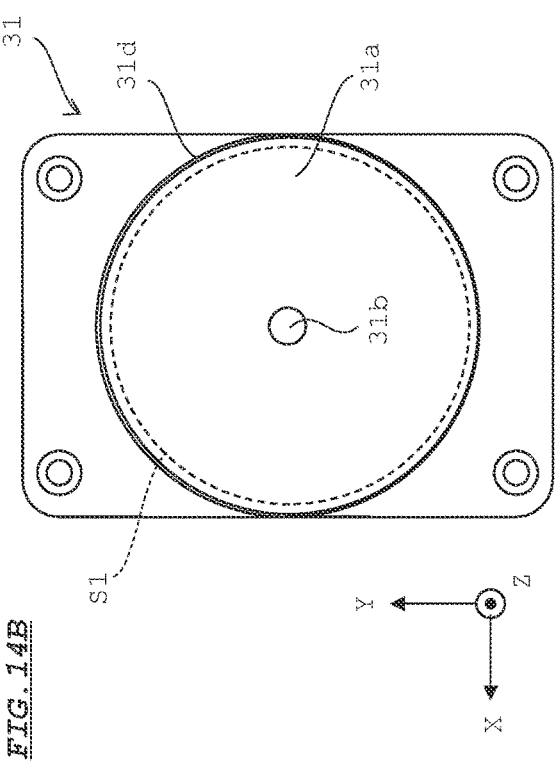

FIG. 14A and FIG. 14B are side views of the condenser mirrors 30 and 31 as seen from the Z-axis positive side, respectively.

In FIG. 14A and FIG. 14B, the width in the X-axis direction and the width in the Y-axis direction of the columnar portion 30d are equal to the width in the X-axis direction and the width in the Y-axis direction of the columnar portion 31d, respectively. In Embodiment 1 described above, the columnar portion 30d has a quadrangular prism shape. Therefore, an area S0 of the reflection surface 30a when viewed from the Z-axis positive side is substantially equal to a value obtained by multiplying the width in the Y-axis direction and the width in the X-axis direction of the columnar portion 30d by each other. Here, a cross-section of the quadrangular prism when viewed from the Z-axis positive side has a substantially square shape. Therefore, when the width in the X-axis direction of the columnar portion 30d is denoted by D, the area S0 is obtained by the following equation.

$$S0=D^2 \quad (1)$$

Meanwhile, in the modification, the columnar portion 31d has a cylindrical shape. Therefore, an area S1 of the reflection surface 30a when viewed from the Z-axis positive side is substantially equal to the area of a circle having a diameter equal to the width D in the X-axis direction of the columnar portion 31d. In this case, the area S1 is obtained by the following equation.

$$S1=\pi D^2/4 \quad (2)$$

From the equations (1) and (2), the area S0 is 127% of the area S1. Therefore, the light-condensing area of the condenser mirror 30 can be increased by about 1.2 times in the configuration of Embodiment 1 shown in FIG. 2, as compared to the configuration of the modification shown in FIG. 13. Accordingly, with the configuration of Embodiment 1, the reflected light R1 can be more efficiently condensed on the photodetector 40, and as a result, the accuracy of moisture sensing can be enhanced.

FIG. 14C shows light-condensing ranges S10 and S11, at the position of the light blocking mask 60a, of the reflected lights R1 condensed by the reflection surface 30a of Embodiment 1 and the reflection surface 31a of the modification. In FIG. 14C, the light-condensing ranges S10 and S11 are additionally shown in a top view of the moisture sensing device 1 in which the condenser mirror 30, 31 is omitted.

As shown in FIG. 14C, in the configuration of Embodiment 1 described above, since the area of the reflection surface 30a is larger as compared to the configuration of the modification, the light-condensing range S10 of the reflected light R1 at the position of the light blocking mask 60a is wider than the light-condensing range S11 in the case of the modification. Therefore, in the configuration of Embodiment 1, the ratio of the reflected light blocked by the light blocking mask 60a to the reflected light condensed on the light-condensing range S10 is smaller as compared to the modification. Therefore, in the configuration of Embodiment 1, more reflected light can be condensed on the light-receiving surface 40a of the photodetector 40 as compared to the configuration of the modification.

As described above, it is preferable that the columnar portion 30d of the condenser mirror 30 has a quadrangular prism shape as in Embodiment 1 described above. That is, it is preferable that the reflection surface 30a has a shape obtained by cutting out a quadrangular prism with a spheroid.

Accordingly, in the case where the widths in the X-axis direction and the Y-axis direction of the columnar portion are equal to each other, more reflected light R1 can be condensed on the light-receiving surface 40a of the photodetector 40.

In other words, in the case of condensing the same amount of the reflected light R1 on the light-receiving surface 40a of the photodetector 40, the shape of the columnar portion 30d is preferably a quadrangular prism shape. Accordingly, the widths in the X-axis direction and the Y-axis direction of the columnar portion 30d can be smaller as compared to the case where the columnar portion is circular, and as a result, the external dimensions of the moisture sensing device 1 can be reduced.

Embodiment 2

In Embodiment 1 described above, the illumination light L1 scattered at the exit of the through hole 30b is blocked by the light blocking mask 60a of the light blocking member 60. On the other hand, in Embodiment 2, by providing a cutout at the inner surface, of the through hole, facing the photodetector 40, scattered light is inhibited from being incident on the photodetector 40.

Figure 16:
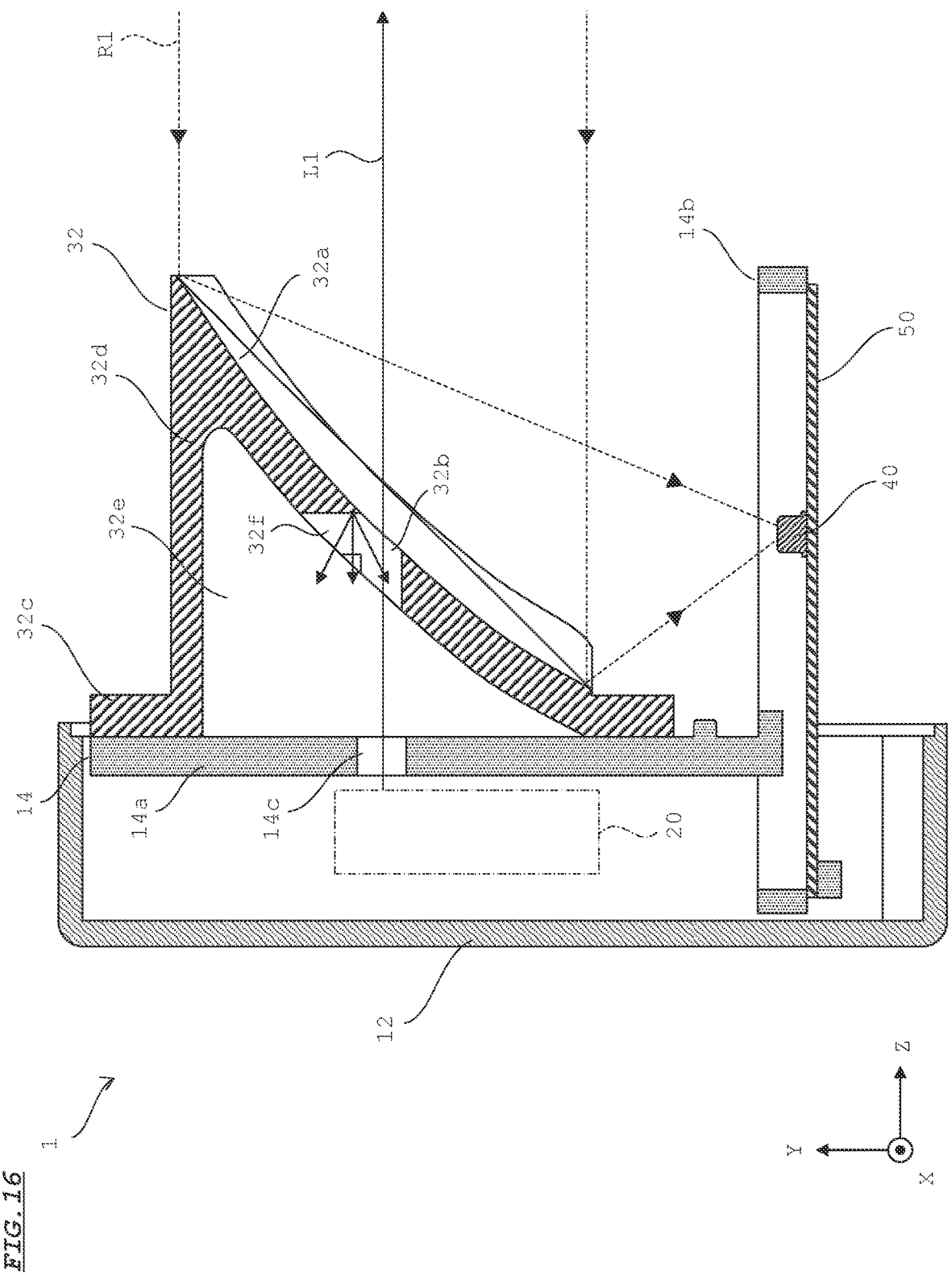
FIG. 16 is a cross-sectional view of the moisture sensing device according to Embodiment 2.
Figure 17B:
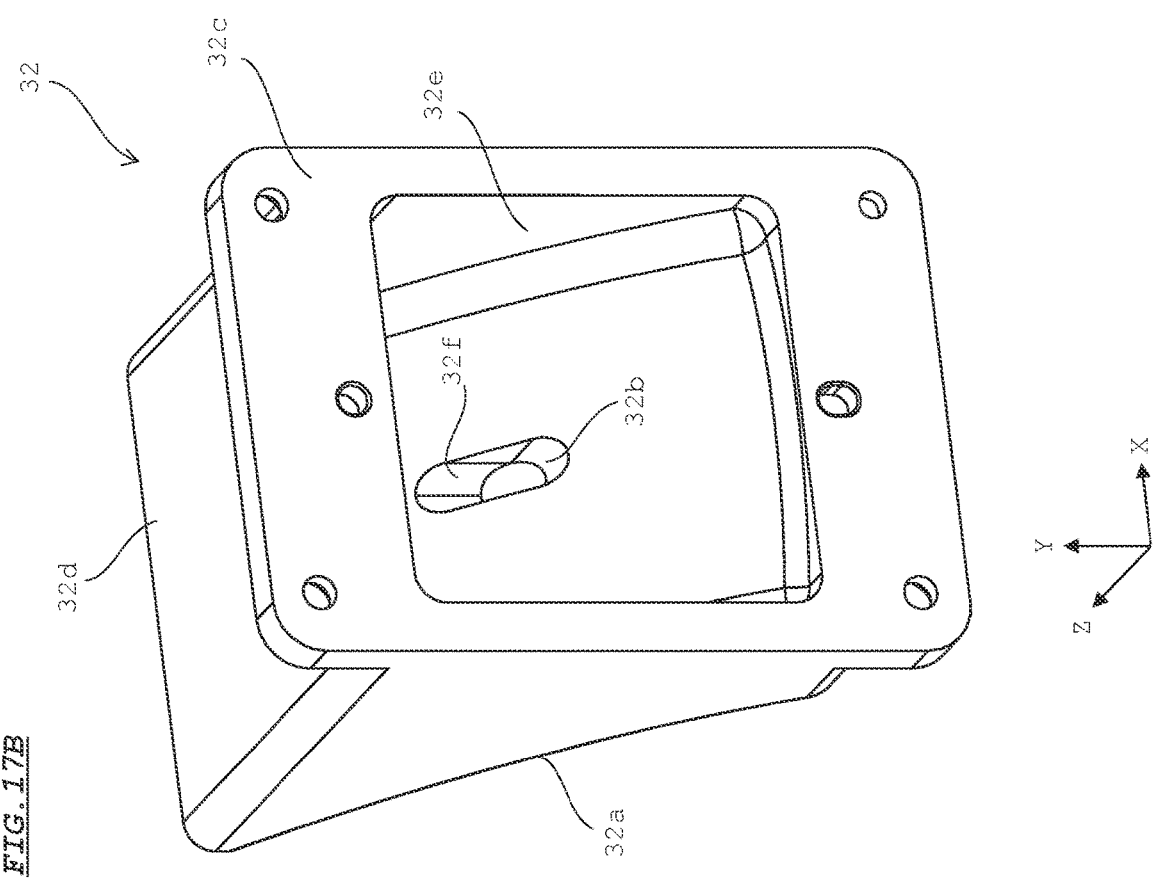
FIG. 17A and FIG. 17B are a rear view and a rear perspective view of a condenser mirror according to Embodiment 2.
Figure 17A:
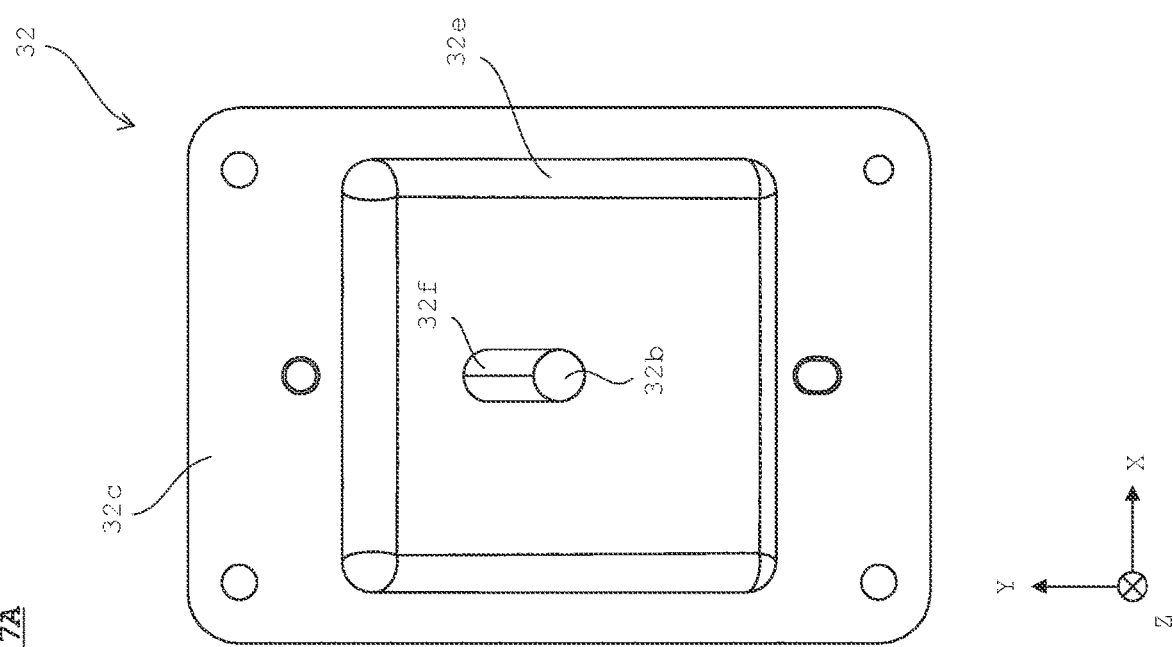

FIG. 15 is a perspective view showing an external configuration of a moisture sensing device 1 in a state where a front housing 11 is removed therefrom, according to Embodiment 2. FIG. 16 is a cross-sectional view of the moisture sensing device 1 in FIG. 15, taken at the center position in the X-axis direction along a plane parallel to the Y-Z plane. FIG. 17A and FIG. 17B are a rear view and a rear perspective view of a condenser mirror 32 according to Embodiment 2, respectively.

In Embodiment 2, the configuration of the condenser mirror 32 is different from that in Embodiment 1. The configuration other than the condenser mirror 32 is the same as that of Embodiment 1.

As shown in FIG. 17A and FIG. 17B, the condenser mirror 32 has a recess 32e which is recessed from a back surface thereof in the Z-axis positive direction and which has a rectangular contour. A through hole 32b penetrates from the recess 32e to a reflection surface 32a in the Z-axis direction. A cutout 32f is formed on the Y-axis positive side of the through hole 32b so as to extend in the Y-axis positive direction. Here, as shown in FIG. 17A, the bottom surface of the recess 32e is recessed in the Z-axis positive direction in a track shape, and the through hole 32b and the cutout 32f are formed in this recess. The through hole 32b and the cutout 32f are connected to each other in a direction parallel to the Y-Z plane.

Similar to Embodiment 1 described above, a columnar portion 32d has a shape obtained by cutting out a quadrangular prism extending in the Z-axis positive direction, with a spheroid. Similar to Embodiment 1 described above, the reflection surface 32a has a shape obtained by cutting out a quadrangular prism having the same width as the columnar portion 32d, with a spheroid. The functions of the reflection surface 32a, the through hole 32b, and a back plate portion 32c are the same as the functions of the reflection surface 30a, the through hole 30b, and the back plate portion 30c of Embodiment 1 described above, respectively.

As shown in FIG. 16, in the configuration of Embodiment 2, the illumination light L1 scattered at the exit of the through hole 32b travels in the direction toward the recess 32e. The scattered light of the illumination light L1 incident on the recess 32e is attenuated as it is being repeatedly reflected by the inner surface of a space surrounded by the recess 32e and the wall plate portion 14a. An infrared light absorber may be applied to the inner surface of the space surrounded by the recess 32e and the wall plate portion 14a.

Thus, in the configuration of Embodiment 2, by providing the cutout 32f at the inner surface, of the through hole 32b, facing the photodetector 40, the illuminated illumination light L1 scattered by the exit of the through hole 32b can be prevented from traveling in the direction toward the photodetector 40. Accordingly, this scattered light can be inhibited from being incident on the light-receiving surface 40a of the photodetector 40. Therefore, as shown in FIG. 15 and FIG.

16, the light blocking member 60 can be omitted, so that the configuration can be simplified and the cost can be reduced.

In Embodiment 2 as well, similar to the modification of Embodiment 1 described above, the shape of the columnar portion 32d may be a cylindrical shape. However, as described above, in order to condense more reflected light R1 on the photodetector 40, the shape of the columnar portion 32d is preferably a quadrangular prism shape as shown in FIG. 15.

In the above configuration, the cutout 32f is formed so as to extend in the Y-axis direction, but the method for forming the cutout 32f is not limited thereto. As long as the illumination light L1 scattered at the exit of the through hole 30b can be prevented from traveling in the direction toward the photodetector 40, the cutout 32f may be formed so as to extend in a direction tilted with respect to the Y axis. In addition, the width of the cutout 32f does not have to be uniform, and for example, the cutout 32f may be formed so as to be wider on the Y-axis positive side.

Embodiment 3

In Embodiments 1 and 2 described above, the through hole 30b is formed in the condenser mirror 30, and the optical axis A1 of the light source part 20 and the optical axis A2 of the condenser mirror 30 are aligned with each other through the through hole 30b. Meanwhile, in Embodiment 3, the optical axis A1 of the light source part 20 and the optical axis A2 of the condenser mirror are aligned with each other by using a small mirror.

Figure 18:
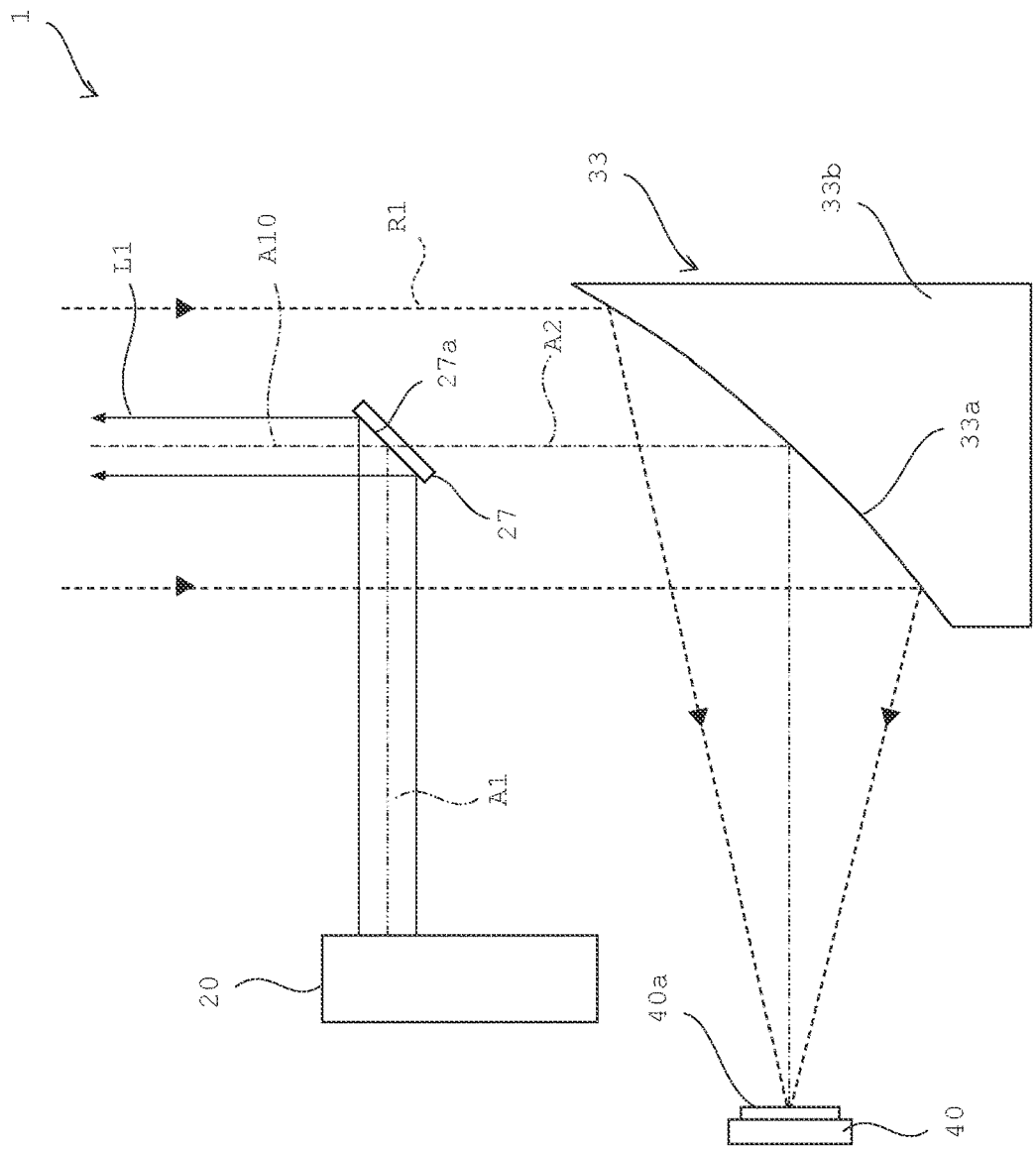
FIG. 18 shows a configuration of an optical system of a moisture sensing device according to Embodiment 3.

FIG. 18 shows a configuration of an optical system of a moisture sensing device 1 according to Embodiment 3.

In the configuration of FIG. 18, an optical element 27 is added as compared to the configuration of Embodiment 1. The optical element 27 is a mirror having a flat plate shape. A reflection surface 27a of the optical element 27 is slightly larger than the beam size of the illumination light L1 collimated by the collimator lenses 22a to 22c of the light source part 20. The shape of the optical element 27 is a shape corresponding to the beam shapes of the illumination light L1 incident on the optical element 27. The optical element 27 reflects the illumination light L1 and also guides the reflected light R1 passing through the area around the optical element 27, to a condenser mirror 33. The optical element 27 bends the optical axis A1 of the light source part 20 in a direction parallel to the optical axis A2 of the condenser mirror 33 to align the optical axes A1 and A2 with each other. The optical element 27 is disposed at the position at which the optical axis A1 of the light source part 20 and the optical axis A2 and the condenser mirror 33 intersect each other.

Similar to Embodiments 1 and 2 described above, the condenser mirror 33 has a reflection surface 33a having a shape obtained by cutting out a quadrangular prism having the same width as a columnar portion 33b, with a spheroid. The method for forming the reflection surface 33a is the same as the method described with reference to FIG. 8. Similar to Embodiment 1 and the modification described above, the reflection surface 33a may have a shape obtained by cutting out a cylinder with a spheroid. The method for setting the reflection surface 33a and the light-receiving surface 40a of the photodetector 40 is the same as in Adjustment Methods 1 to 3 described above in Embodiment 1.

With the configuration of FIG. 18 as well, the optical axis A1 of the light source part 20 and the optical axis A2 of the condenser mirror 30 can be aligned with the common optical axis A10 by the optical element 27. Therefore, similar to the above embodiments, the angles of the illumination light L1 and the reflected light R1 with respect to the road surface do not need to be adjusted in accordance with the distance between the moisture sensing device 1 and the road surface, and even without such adjustment, the reflected light R1 from the road surface can be appropriately received by the photodetector 40.

The reflection surface 33a of the condenser mirror 33 has a shape obtained by cutting out a quadrangular prism extending in the projection direction of the illumination light L1, with a spheroid whose rotation axis is a major axis. Therefore, similar to Embodiments 1 and 2 described above, the reflected light R1 from the sensing region can be efficiently guided to the photodetector 40. Therefore, the state of moisture on the sensing region can be more accurately sensed.

In the configuration of FIG. 18 as well, the light blocking mask 60a may be disposed in order to prevent the illumination light L1 scattered at an edge portion of the optical element 27 from being incident on the light-receiving surface 40a of the photodetector 40. Accordingly, unnecessary light other than the reflected light R1 can be inhibited from being incident on the photodetector 40, and as a result, the accuracy of moisture sensing can be enhanced.

<Other Modifications>

In Embodiments 1 to 3 and the modification described above, lights having three kinds of wavelengths are used as the illumination light L1, but the number of kinds of wavelengths used for the illumination light L1 is not limited to three. For example, the type of a deposit may be determined by using two light sources that respectively emit illumination light L1 having a reference wavelength and illumination light L1 having an absorption wavelength, and a radiation temperature sensor that detects the temperature of a road surface. In this case, either one of the dichroic mirrors 24 and 25 is omitted from the light source part 20.

In the configuration of FIG. 4A and FIG. 4B, the optical axes of the light sources 21a to 21c are aligned with each other by using the two dichroic mirrors 24 and 25, but the configuration for aligning the optical axes is not limited thereto. For example, one of the dichroic mirrors 24 and 25 may be replaced with a polarizing beam splitter and the polarization direction of the laser light emitted from each light source may be adjusted, thereby aligning the optical axes of the light sources 21a to 21c with each other. For example, in the case where the dichroic mirror 25 is replaced with a polarizing beam splitter, it is sufficient that the light sources 21a to 21c are disposed such that the laser lights emitted from the light sources 21a and 21b are P-polarized with respect to the polarizing beam splitter and the laser light emitted from the light source 21c is S-polarized with respect to the polarizing beam splitter.

In Embodiments 1 to 3 and the modification described above, light having the reference wavelength and emitted from the light source 21a is near infrared light having a wavelength of 980 nm. However, the reference wavelength is not limited to 980 nm, and may be another wavelength at which absorption by water is little. The light having the reference wavelength is not limited to near infrared light, and may be visible light having a wavelength of not greater than 750 nm. However, when the light having the reference wavelength is visible light, the road surface 3a is irradiated with the visible light, which may cause a trouble in the traffic on the road 3. Therefore, the light having the reference wavelength is preferably near infrared light.

The shapes and the sizes of the optical components included in the optical system are not limited to those shown in Embodiments 1 to 3 and the modification described above, and can be changed as appropriate.

The distance measurement range is not limited to the ranges shown in Adjustment Methods 1 to 3 described above, and can be changed as appropriate. In addition, the first focal distance FD1 and the second focal distance FD2 for setting the shape of the reflection surface, and the major axis AX1 and the minor axis AX2 of the ellipse are also not limited to the values shown in Adjustment Methods 1 to 3 described above, and can be changed as appropriate. The method for adjusting the reflection surface and the light-receiving surface is also not necessarily limited to Adjustment Methods 1 to 3 described above.

In the determination process shown in FIG. 7, the type of a deposit on the road surface is determined. However, the determination target is not limited thereto. The thickness, slipperiness, or the like of the deposit may further be determined.

In Embodiments 1 to 3 and the modification described above, the state (water, ice, snow) of moisture on the road surface is sensed. However, the sensing region on which the state of moisture is sensed is not necessarily limited to the road surface. For example, the present invention may be applied to a moisture sensing device that senses the state of moisture on a surface of a floor or a desk, or a moisture sensing device that senses moisture on a leaf. In this case, in accordance with the type or the like of moisture to be sensed, the number and kinds of lights to be used in sensing may be adjusted.

Further, the application examples of the moisture sensing device 1 are not limited to the road surface information delivery system 200 shown in FIG. 8 and an application example in which the moisture sensing device 1 is mounted on a vehicle. The moisture sensing device 1 may be used in another configuration in which the state of moisture of a target object is detected by using illumination light and reflected light.

In the above embodiments, as one aspect of the optical device according to the present invention, a moisture sensing device for sensing moisture (water, snow, ice, or the like) on a sensing region has been illustrated. However, the optical device according to the present invention is not limited thereto, and may be an optical device according to another aspect having an emission optical system and a light-receiving optical system.

For example, the present invention may be applied to a laser radar that projects light to a sensing region, receives light reflected on the sensing region, and detects the presence or absence of an object in the sensing region. In this case, the light source part 20 does not necessarily have to project illumination lights having a plurality of wavelengths, and for example, may project only illumination light in an infrared wavelength band, to the sensing region. In addition, the laser radar may measure the distance to an object existing in the sensing region on the basis of the time difference between the projection timing of the illumination light and the reception timing of the reflected light.

In addition to the above, various modifications can be made as appropriate to the embodiment of the present invention, without departing from the scope of the technological idea defined by the claims.

What is claimed is:

1. An optical device comprising:
    a light source configured to project illumination light toward a sensing region;
    a photodetector configured to receive reflected light of the illumination light reflected on the sensing region; and
    a condenser mirror configured to condense the reflected light on the photodetector, wherein
    the condenser mirror has
        a through hole through which the illumination light emitted from the light source passes,
        a reflection surface having a shape obtained by cutting out a columnar body extending along an optical axis of the light source, with a spheroid whose rotation axis is a major axis, such that the condenser mirror has a first focal position and a second focal position different from the first focal position along the major axis of the spheroid, and
        a first optical axis extending from the reflection surface toward the first focal position and a second optical axis, aligned with the optical axis of the light source, extending from the reflection surface toward the second focal position,
    the photodetector is disposed on the first optical axis, and
    the sensing region is set on the second optical axis.

2. The optical device according to claim 1, wherein the columnar body is a quadrangular prism.

3. The optical device according to claim 1, wherein through hole has a cutout at an inner surface thereof facing the photodetector.

4. The optical device according to claim 1, further comprising a light blocking mask, provided between an exit of the through hole and the photodetector, for blocking the illumination light scattered at the exit of the through hole.

5. The optical device according to claim 1, wherein the second focal position is set to a farthest distance position in a distance measurement range.

6. The optical device according to claim 5, wherein a light-receiving surface of the photodetector is located at the first focal position.

7. The optical device according to claim 5, wherein the photodetector is disposed at such a position that a spot size of the reflected light reflected at the farthest distance position is equal to a size of a light-receiving surface of the photodetector.

8. The optical device according to claim 1, wherein
    the second focal position is set to a distance position between a farthest distance position and a nearest distance position in a distance measurement range, and
    a size of a light-receiving surface of the photodetector is set such that a spot size, on the light-receiving surface of the photodetector, of the reflected light reflected at the farthest distance position is equal to or smaller than the size of the light-receiving surface.

9. The optical device according to claim 1, wherein a size of a light-receiving surface of the photodetector is smaller than a spot size, on the light-receiving surface, of the reflected light reflected at a nearest distance position in a distance measurement range.

10. The optical device according to claim 1, wherein the light source includes:
    a plurality of light sources configured to emit lights having wavelengths different from each other; and
    an alignment optical system configured to align emission optical axes of the light sources with each other.

11. The optical device according to claim 10, further comprising a processor programmed to determine a deposit on the sensing region on the basis of a detection signal from the photodetector.

12. The optical device according to claim 11, wherein
the light source includes a first light source, a second light source, and a third light source configured to respectively emit lights having a first wavelength, a second wavelength, and a third wavelength different from each other,
out of the first light source, the second light source, and the third light source, two light sources each emit detection light having a wavelength at which absorption coefficients with respect to water and ice are high, and a remaining one light source emits reference light having a wavelength at which absorption coefficients with respect to water and ice are low, and
the processor is further programmed to determine the deposit on the basis of signals obtained by normalizing the detection signals with respect to the two detection lights by the detection signal with respect to the reference light.

13. The optical device according to claim 12, wherein the processor is further programmed to determine water, ice, and snow as the deposit.

14. The optical device according to claim 1, wherein the first optical axis of the condenser mirror is perpendicular to the second optical axis of the condenser mirror.

15. The optical device according to claim 1, wherein the optical axis of the light source is fixed and extends toward the reflection surface through the through hole of the condenser mirror.

16. An optical device comprising:
a light source configured to project illumination light toward a sensing region;
a photodetector configured to receive reflected light of the illumination light reflected on the sensing region; and
a condenser mirror configured to condense the reflected light on the photodetector, wherein
the condenser mirror has
a reflection surface having a shape obtained by cutting out a columnar body extending along an optical axis of the light source, with a spheroid whose rotation axis is a major axis, such that the condenser mirror has a first focal position and a second focal position different from the first focal position along the major axis of the spheroid, and
a first optical axis extending from the reflection surface toward the first focal position and a second optical axis, aligned with the optical axis of the light source, extending from the reflection surface toward the second focal position,
the photodetector is disposed on the first axis, and
the sensing region is set on the second optical axis.

17. The optical device according to claim 16, further comprising an optical element configured to align an optical axis of the light source and an optical axis of the condenser mirror with each other.

* * * * *